United States Patent
Imai et al.

(10) Patent No.: US 8,401,237 B2
(45) Date of Patent: Mar. 19, 2013

(54) IMAGE PROCESSING PROGRAM, IMAGE PROCESSING APPARATUS, IMAGE PROCESSING METHOD AND IMAGE PROCESSING SYSTEM

(75) Inventors: Daiji Imai, Kyoto (JP); Atsushi Okumura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 238 days.

(21) Appl. No.: 12/816,705

(22) Filed: Jun. 16, 2010

(65) Prior Publication Data

US 2011/0222735 A1 Sep. 15, 2011

(30) Foreign Application Priority Data

Mar. 10, 2010 (JP) ................................ 2010-052530

(51) Int. Cl.
*G06K 9/00* (2006.01)
(52) U.S. Cl. ...................................................... 382/106
(58) Field of Classification Search .................. 382/155, 382/156, 159, 160, 224, 228
See application file for complete search history.

(56) References Cited

U.S. PATENT DOCUMENTS

| | | | | |
|---|---|---|---|---|
| 5,781,704 A | * | 7/1998 | Rossmo | 706/45 |
| 6,845,171 B2 | * | 1/2005 | Shum et al. | 382/100 |
| 7,564,816 B2 | * | 7/2009 | McHenry et al. | 370/329 |
| 7,824,265 B2 | * | 11/2010 | Kobayashi | 463/33 |
| 8,031,961 B2 | * | 10/2011 | Nachlieli et al. | 382/254 |
| 2002/0113884 A1 | * | 8/2002 | Tanii et al. | 348/241 |

OTHER PUBLICATIONS

Nintendo Corporation, "Itudemo purikura□kiradeko puremiamu: konna puri ga satuei dekimasu!", [online], [searched on Feb. 3, 2010], the Internet URL:http://www.nintendo.co.jp/ds/dsiware/khdj/film/index.html, 2 paged.

Adobe Systems Incorporated, "Adobe Photoshop Elements","gyakkou" firuta de syasin wo ensyutusiyou, [online], [searched on Feb. 3, 2010], the Internet URL:http://www.adobe.com/jp/digitalimag/consumer/portal/tips/04/stepupTip.html, 4 pages.

* cited by examiner

*Primary Examiner* — Samir Ahmed
*Assistant Examiner* — Totam Le
(74) *Attorney, Agent, or Firm* — Nixon & Vanderhye P.C.

(57) ABSTRACT

As to each section making up of an original image, a CPU of an image processing apparatus calculates a distance from a predetermined position, for example, a center of the original image to a center of the section, sets a probability in accordance with the calculated distance, determines whether or not the section is a section where an object is to be drawn according to the set probability, and draws an object in each section which is determined as a section to be drawn.

22 Claims, 17 Drawing Sheets

FIG. 6 (A)
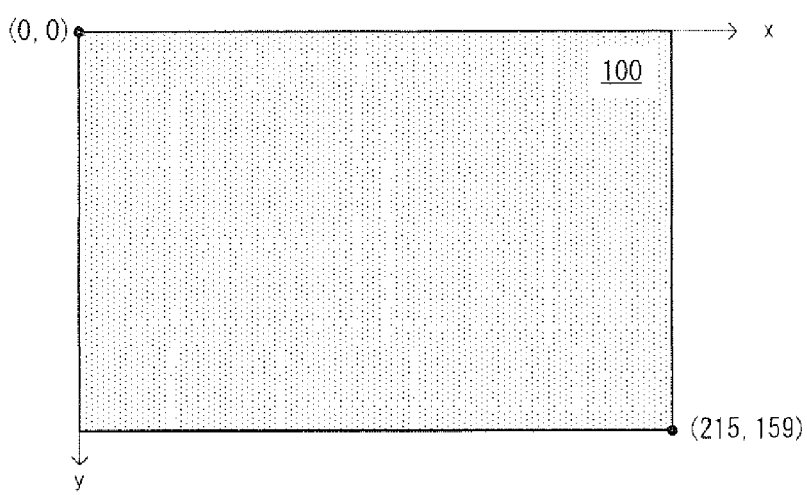
(B)
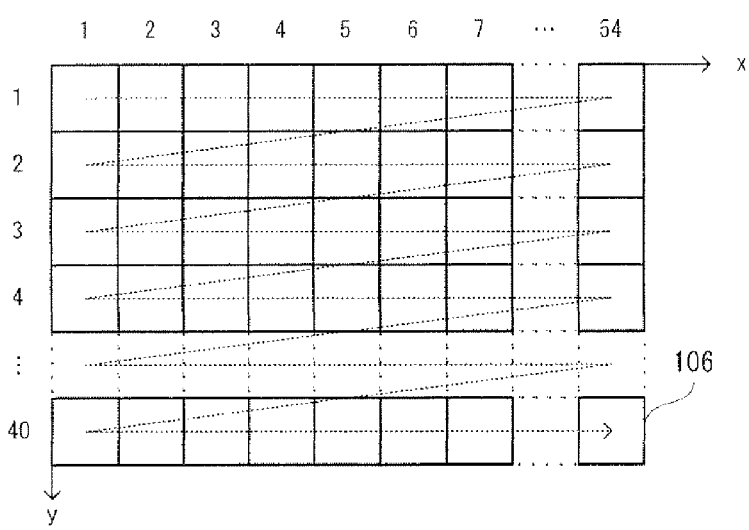
FIG. 7
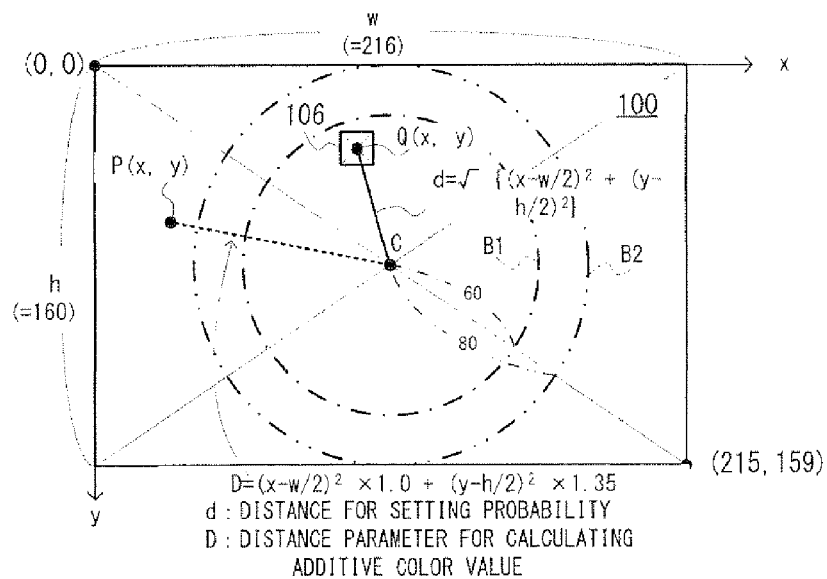

FIG. 8

(A) (PROBABILITY TABLE) 80

| DISTANCE FROM CENTER (d) | PROBABILITY |
|---|---|
| 0-60 | 1% |
| 61-80 | 2% |
| 81~ | 5% |

(B) (MAGNIFICATION TABLE) 82

| KIND OF OBJECT | MAGNIFICATION (PROBABILITY CORRECTION VALUE) |
|---|---|
| SNOW CRYSTAL (LARGE) | ×0.5 |
| SNOW CRYSTAL (MIDDLE) | ×1.0 |
| SNOW CRYSTAL (SMALL) | ×2.0 |

FIG. 9

(A) (NOTICEABLE PIXEL DATA) 76

| PIXEL NUMBER | DISTANCE PARAMETER (D) | ADDITIVE COLOR VALUE (A) |
|---|---|---|
| (0, 0) | 20304 | 17.56 |
| (30, 20) | 10944 | 7.16 |
| (60, 40) | 4464 | 0 |

(B) (NOTICEABLE SECTION DATA) 78

| SECTION NUMBER | DISTANCE (d) | PROBABILITY (p) BEFORE CORRECTION→AFTER CORRECTION | KIND OF OBJECT | ASSIGNED VALUE |
|---|---|---|---|---|
| (1, 1) | 132 | 5%→2.5% | SNOW CRYSTAL (LARGE) | 73 |
| (1, 2) | 130 | 5%→10% | SNOW CRYSTAL (SMALL) | 8 |

FIG. 10
(A)
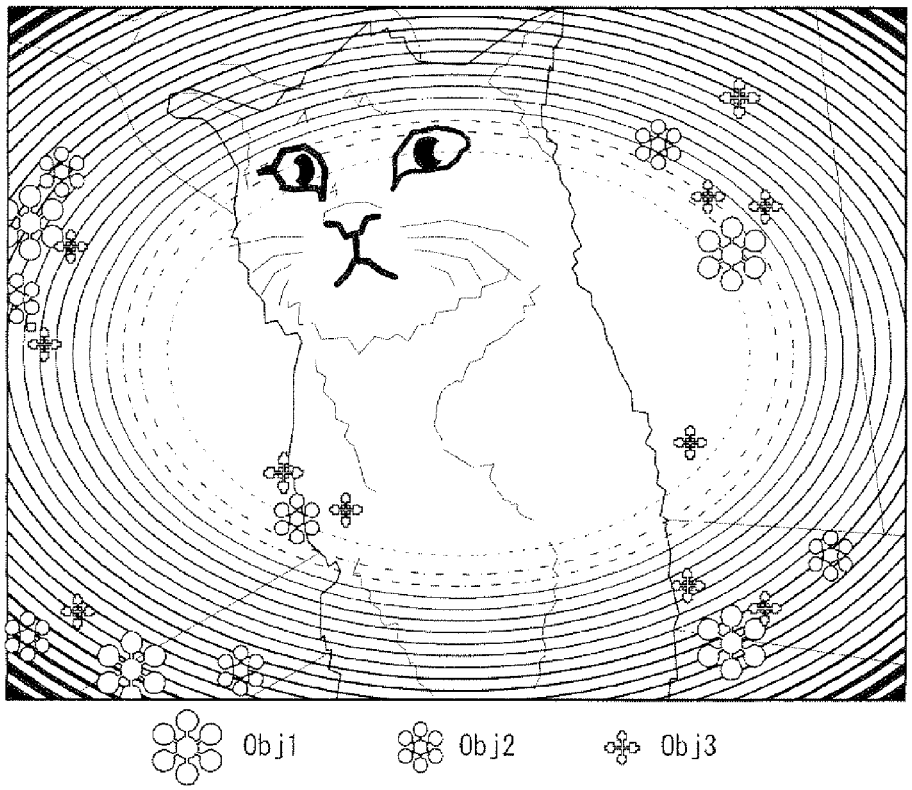
 Obj1     Obj2     Obj3
(B)
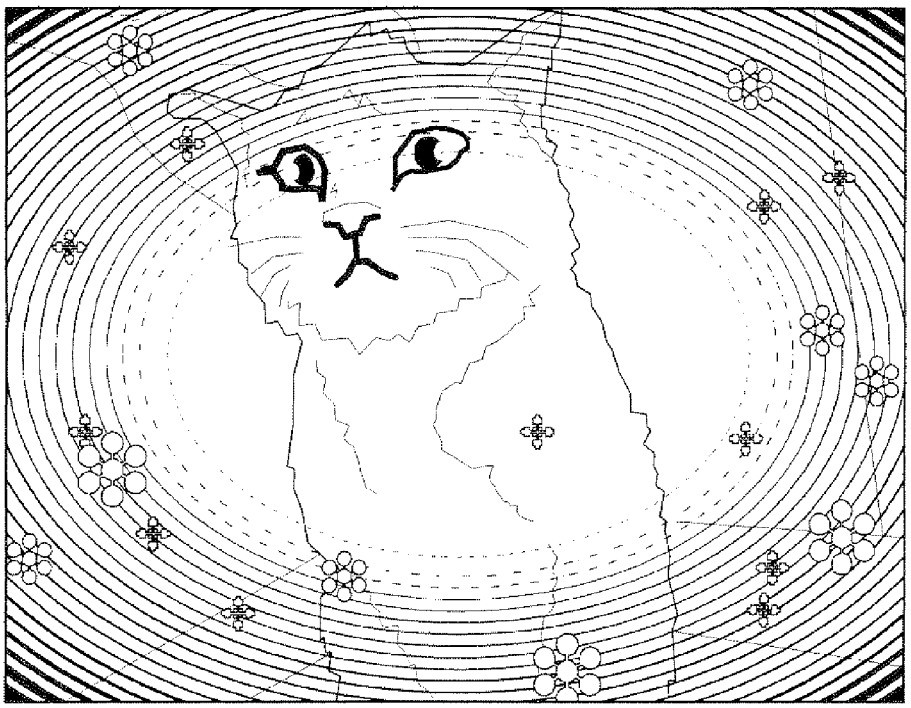

FIG. 11
(A) (FOR COMPARISON : WHEN SETTING PROBABILITY DEPENDING ON DISTANCE IS NOT PERFORMED)
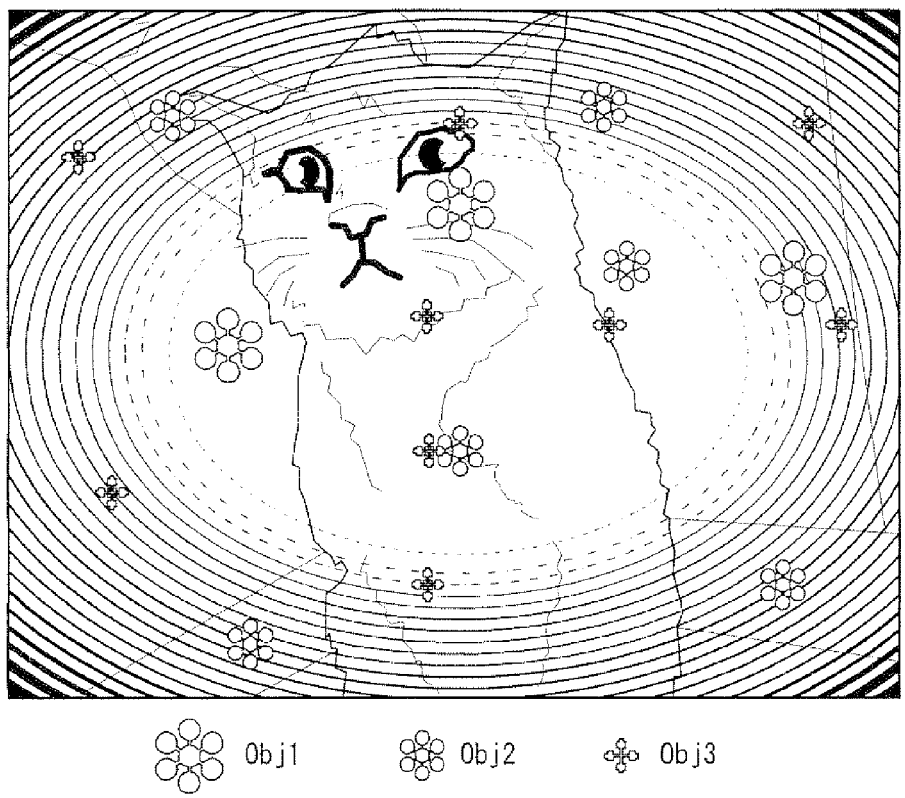
 Obj1   Obj2   Obj3
(B) (FOR COMPARISON : WHEN NEITHER SETTING PROBABILITY DEPENDING ON DISTANCE NOR PROBABILITY CORRECTION ACCORDING TO KIND IS PERFORMED)
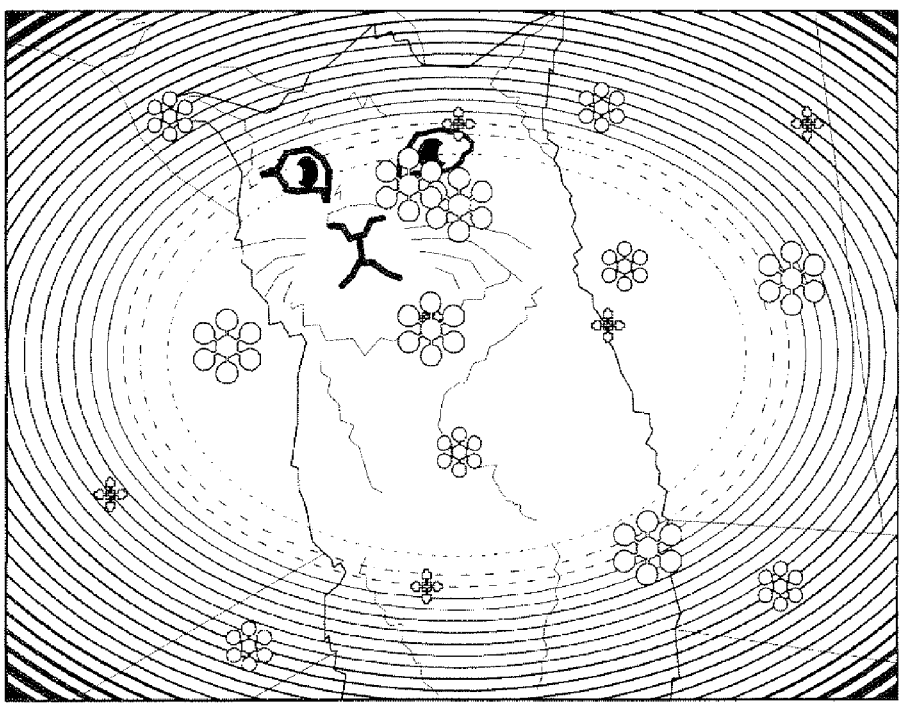

FIG. 17 (MAIN MENU SCREEN)
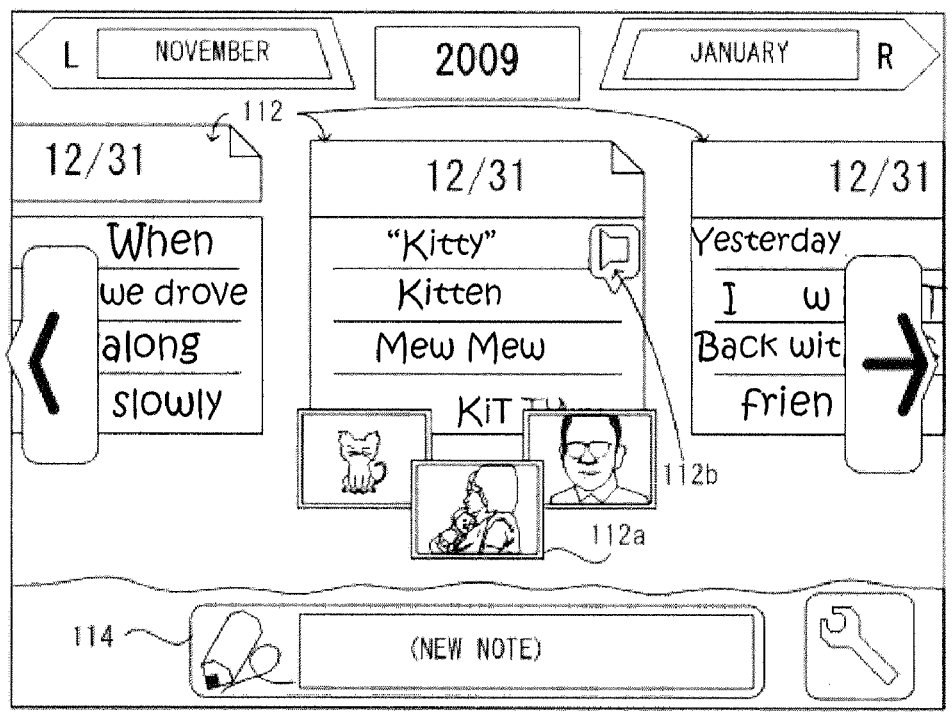
FIG. 18 (NOTE CREATING SCREEN)
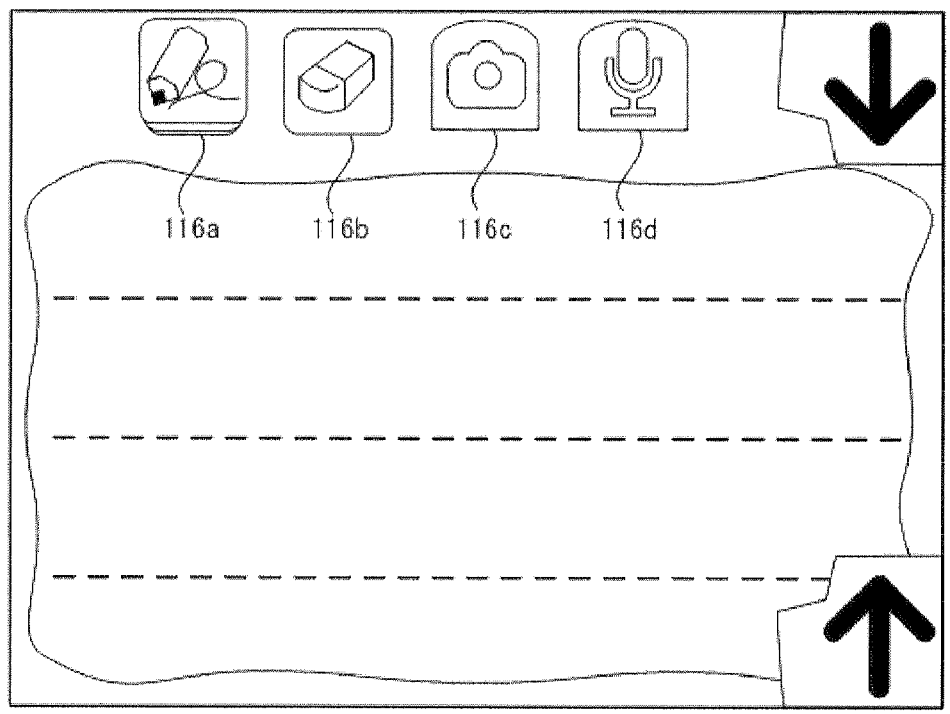

FIG. 20
(A)
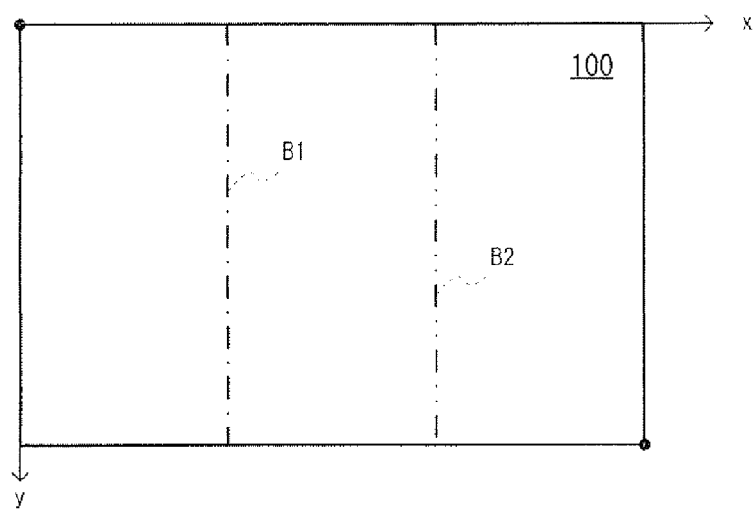
(B)
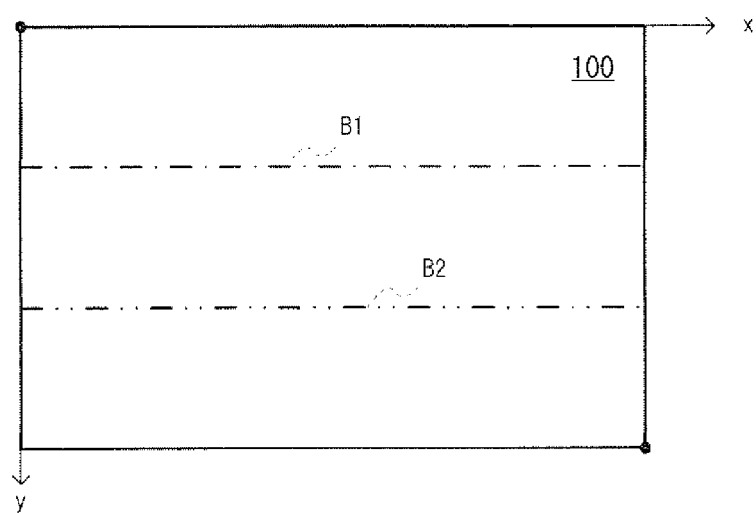
(C)
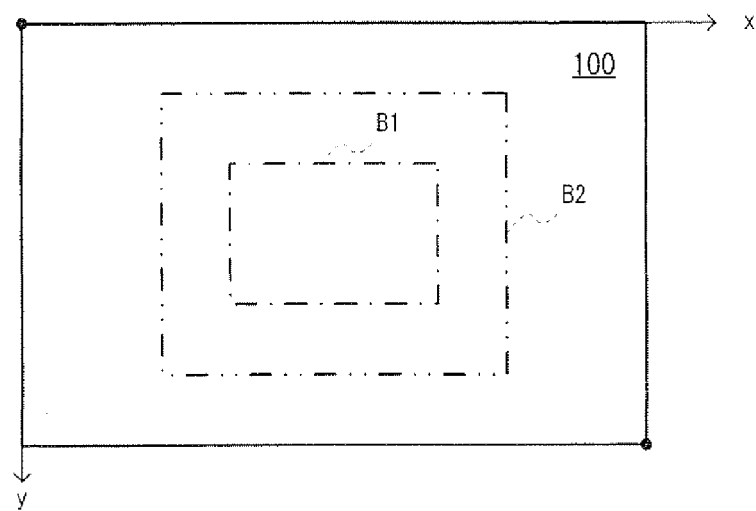

IMAGE PROCESSING PROGRAM, IMAGE PROCESSING APPARATUS, IMAGE PROCESSING METHOD AND IMAGE PROCESSING SYSTEM

CROSS REFERENCE OF RELATED APPLICATION

The disclosure of Japanese Patent Application No. 2010-52530 is incorporated herein by reference.

BACKGROUND

1. Field

Example embodiments of the present invention relate to an image processing program, an image processing apparatus, an image processing method and an image processing system. More specifically, example embodiments of the present invention relate to an image processing program, an image processing apparatus, an image processing method and an image processing system for editing an image.

2. Description of the Related Art

Conventionally, there are examples of arranging a predetermined object at an arbitrary position on an image, and adding a decoration frame (frame) so as to surround especially the center thereof, in editing an image.

In a nonpatent literature 1, a program of implementing a "stamp" function of arranging a decoration at a touched position with a touch pen as if a stamp is affixed and a "frame" function of adding a decoration frame so as to surround the center of the image in order to contrast a subject, etc. at the center of the image is disclosed.

In a nonpatent literature 2, a "backlight filter" for arranging light for directing brightness (highlight effect) is disclosed. The position of the highlight can be adjusted according to a designation by a user.

(Nonpatent Literature 1)

Nintendo Corporation, "Itudemo purikura ☆ kiradeko puremiamu: konna puri ga satuei dekimasu!", [online], [searched on Feb. 3, 2010], the Internet <URL:http://www.nintendo.co.jp/ds/dsiware/khdj/film/index.html>

(Nonpatent Literature 2)

Adobe Systems Incorporated, "Adobe Photoshop Elements", "gyakkou" firuta de syasin wo ensyutusiyou", [online], [searched on Feb. 3, 2010], the Internet <URL:http://www.adobe.com/jp/digitalimag/consumer/portal/tips/04/stepupTip.html>

However, the "stamp" function disclosed in the nonpatent literature 1 is for arranging an object at a position designated by the user, and therefore, designating an arrangement position of the object is time consuming. Furthermore, the "frame" function is for overlaying a decoration frame defined in advance on the original image, making the decoration frame simple and resulting in a monotonous decoration. In addition, the "backlight filter" disclosed in the patent literature 2 is also for adding an effect at a position designated by the user, and therefore, designating every position is time consuming.

SUMMARY

Therefore, example embodiments of the present invention provide a novel image processing program, an image processing apparatus, an image processing method and an image processing system.

Example embodiments of the present invention provide an image processing program, an image processing apparatus, an image processing method and an image processing system allowing a user to perform a predetermined drawing on an image irrespective of a user's own designation.

Example embodiments present invention provide an image processing program, image processing apparatus, image processing method and image processing system capable of making a drawing in varied manners every time and in a manner that a subject, etc. of the image can be contrasted.

Example embodiments of present invention adopt the following construction in order to solve the above-mentioned problems.

A first invention is a storage medium storing an image processing program, and the image processing program is an image processing program causing a computer of an image processing apparatus to function as: a distance calculator which calculates a distance from a predetermined position on an image to each position on the image; a probability setter which sets a probability in correspondence with the distance calculated by the distance calculator as to each of the positions; a position-to-be drawn determiner which determines whether or not the position becomes a position-to-be drawn at which a predetermined drawing is to be performed according to the probability set by the probability setter as to each of the positions; and a drawer which performs the predetermined drawing on each position which is determined as a position-to-be drawn by the position-to-be drawn determiner.

In the first invention, a distance from a predetermined position on an image to each position on the image is calculated by a distance calculator. A probability setter sets a probability in correspondence with the distance calculated by the distance calculator as to each of the positions, and a position-to-be drawn determiner determines whether or not the position becomes a position-to-be drawn at which a predetermined drawing is to be performed according to the probability set by the probability setter as to each of the positions. A drawer performs the predetermined drawing on each position which is determined as a position-to-be drawn by the position-to-be drawn determiner.

Here, the predetermined position of the image is typically a center (C) of the image, but may be an arbitrary position within the image. Under certain circumstances, the predetermined position can be defined outside the image. Furthermore, each position on the image is a position by sections being made up of a plurality of pixels or by pixels. In addition, the predetermined drawing includes a drawing of objects and/or a drawing of effects, for example. Drawing effects here is to add effects (special effects: blur, sharpness, gradation, hue, backlight filter effects, etc.) to the image, and is implemented by changing pixel values by calculation such as a filter arithmetic operation, for example. Additionally, the distance is not necessarily a distance d itself defined by (Equation 2) of this embodiment, and may be a parameter D in relation to the distance defined by the (Equation 1) of this embodiment.

According to the first invention, it is possible to change the probability of performing a drawing in correspondence with the distance from the predetermined position, and to perform varied drawings according to the probabilities irrespective of a user's designation.

A second invention is a storage medium storing an image processing program according to the first invention, and the predetermined position is a central position of the image, and the probability setter sets a high probability as the distance calculated by the distance calculator is large.

According to the second invention, in correspondence with the distance from the object at the center of the image, drawing can be performed at different probabilities, and the subject can be contrasted with varied drawings irrespective of a user's designation (a decoration frame being made up of a plurality of objects, for example).

Here, positioning the subject at the center of the image is taken as a precondition, but if the subject is at a position different from the center (upper left corner of the image, for example), the position may be taken as a predetermined position. In addition, the predetermined position is not restricted to a fixed position, and may be moved as required. For example, if a face detecting function is combined with this invention, the predetermined position is made to follow the detected face position, and thus, there is no need of deciding in advance a position (composition of a photograph) where a person stands.

A third invention is a storage medium storing an image processing program according to the first invention, and the image is made up of a plurality of sections each including two or more pixels, the distance calculator calculates a distance from the predetermined position on the image to each section on the image, the probability setter sets a probability in correspondence with the distance to the section calculated by the distance calculator as to each of the sections, the position-to-be drawn determiner determines whether or not the section becomes a position-to-be drawn at which a predetermined drawing is to be performed according to the probability set by the probability setter as to each of the sections, and the drawer performs the predetermined drawing once on each position which is determined as a position-to-be drawn by the position-to-be drawn determiner.

According to the third invention, one or more drawing is performed on the section being made up of a plurality of pixels, and therefore, a plurality of drawings are never performed within the section. Thus, drawings are never performed densely, allowing for provision of an image enhanced in appearance.

A fourth invention is a storage medium storing an image processing program according to the first invention, and the image processing program causes the computer of the image processing apparatus to further function as: an object selector which selects an object to be drawn at each position from a plurality of objects being different in kind; and a probability corrector which corrects the probability set by the probability setter depending on the kind of the object selected by the object selector, and the position-to-be drawn determiner determines whether or not the position becomes a position-to-be drawn at which the predetermined drawing is to be performed according to the probability corrected by the probability corrector as to each of the positions.

In the fourth invention, from a plurality of objects being different in kind, an object to be drawn at each position is selected by an object selector. A probability corrector corrects the probability set by the probability setter depending on the kind of the object thus selected. The position-to-be drawn determines whether or not the position becomes a position-to-be drawn at which the predetermined drawing is to be performed according to the probability corrected by the probability corrector as to each of the positions.

According to the fourth invention, the probability is corrected depending on the kind of the object, and therefore, it is possible to change the degree of density between the large objects and the small objects even as to the objects having the same distance.

A fifth invention is a storage medium storing an image processing program according to the first invention, and the image processing program causes a computer of the image processing apparatus to further function as: an additive color value calculator which calculates an additive color value in correspondence with the distance calculated by the distance calculator; and an additive color value adder which adds the additive color value calculated by the additive color value calculator to at least one color component at each of the positions.

In the fifth invention, an additive color value (A) in correspondence with the distance calculated by the distance calculator is calculated by an additive color value calculator. An additive color value adder adds the additive color value thus calculated to at least one color component at each of the positions. If this is added to a B component, blue is added or emphasized in correspondence with the distance. In addition, if this is added to an R component and a G component, yellow can be taken on.

According to the fifth invention, by adding a color in correspondence with the distance from the predetermined position, it is possible to further contrast the subject at the predetermined position.

A sixth invention is a storage medium storing an image processing program according to the fifth invention, and the additive color value calculator increases the additive color value as the distance calculated by the distance calculator is large.

According to the sixth invention, less drawings are performed toward the predetermined position (the center of the image, for example), and more drawings are performed away from the predetermined position. A low color is added to the predetermined position, and a high color is added far away from the predetermined position. Thus, it is possible to more contrast the subject at the predetermined position in combination with the drawing and the color addition.

A seventh invention is a storage medium storing an image processing program according to the first invention, and the image processing program causes a computer of the image processing apparatus to function as: an outputter which outputs the image which has undergone the predetermined drawing by the drawer; and an execution controller which performs a series of image processing by the distance calculator or by the outputter on the image which has not yet undergone the predetermined drawing every time that an execution instruction is issued.

In the seventh invention, the image which has undergone the predetermined drawing by the drawer is output by an outputter. An execution controller performs a series of image processing by the distance calculator or by the outputter on the image which has not yet undergone the predetermined drawing every time that an execution instruction is issued. Here, an outputting end of the image by the outputter is a display (displayer) provided to the image processing apparatus in a certain embodiment, but may be an external display (displayer). In addition, there is no need of being displayed immediately, and therefore, the image may be output to a memory (storage) provided to the image processing apparatus and an external memory (storing apparatus).

That is, the predetermined drawing is performed based on the probability, and therefore, even the same image to be drawn changes every time. Hereupon, the image which has undergone the predetermined drawing is output to thereby receive a further execution instruction.

According to the seventh invention, the user confirms the image which has undergone the predetermined drawing, and can perform a drawing on the same image any number of times if he or she is not in favor of it.

An eighth invention is a storage medium storing an image processing program according to the seventh invention, and the image processing program causes a computer of the image processing apparatus to further function as: a storage which stores the image which has already undergone the predetermined drawing when a saving instruction is issued with the image which has already undergone the predetermined drawing output.

In the eighth invention, when a saving instruction is issued with the image which has already undergone the predetermined drawing displayed (output), a storages stores the image which has already undergone the predetermined drawing.

According to the eighth invention, if the user is in favor of the image which has already undergone the drawing, this can be stored.

A ninth invention is a storage medium storing an image processing program according to the third invention, and the distance calculator further calculates a distance from the predetermined position of the image to each pixel (P) of the image, and the image processing program causes the computer of the image processing apparatus to further function as: an additive color value calculator which calculates an additive color value (A) in correspondence with the distance to each pixel calculated by the distance calculator; and an additive color value adder which adds the additive color value calculated by the additive color value calculator to at least one color component of each of the pixels.

In the ninth invention, the drawing is performed by sections, and the color addition is performed by pixels.

According to the ninth invention, the drawing is performed by sections, and thus, it is possible to prevent drawings being performed densely. Furthermore, the color addition is performed by pixels, thus, it is possible to make changes in color smooth. Accordingly, it is possible to obtain an image enhanced in appearance.

A tenth invention is a storage medium storing an image processing program according to the first invention, and the image processing apparatus further comprises an imager, the image processing program causes the computer of the image processing apparatus to further function as an image reader which reads an image imaged by the imager, and the distance calculator calculates a distance from the predetermined position on the image read by the image reader to each position on the image.

According to the tenth invention, it is possible to perform drawing by taking a photograph.

An eleventh invention is an image processing system comprising: a distance calculator which calculates a distance from a predetermined position on an image to each position on the image; a probability setter which sets a probability in correspondence with the distance calculated by the distance calculator as to each of the positions; a position-to-be drawn determiner which determines whether or not the position becomes a position-to-be drawn at which a predetermined drawing is to be performed according to the probability set by the probability setter as to each of the positions; and a drawer which performs the predetermined drawing on each position which is determined as a position-to-be drawn by the position-to-be drawn determiner.

Here, the image processing system may be made up of a plurality of image processing apparatuses, and may be made up of one or a plurality of image processing apparatuses and other appliances, such as a server, etc. for example. Each means of the image processing system may be distributedly provided to such components.

A twelfth invention is an image processing method comprising: a distance calculating step for calculating a distance from a predetermined position on an image to each position on the image; a probability setting step for setting a probability in correspondence with the distance calculated by the distance calculating step as to each of the positions; a position-to-be drawn determining step for determining whether or not the position becomes a position-to-be drawn at which a predetermined drawing is to be performed according to the probability set by the probability setting step as to each of the positions; and a drawing step for performing the predetermined drawing on each position which is determined as a position-to-be drawn by the position-to-be drawn determining step.

According to each of the eleventh to twelfth inventions, similar to the first invention, it is possible to perform varied drawings according to the probabilities irrespective of a user's designation.

Example embodiments of present invention implement an image processing program, an image processing apparatus, an image processing method and an image processing system capable of performing a predetermined drawing on the image irrespective of a user's designation.

Furthermore, example embodiments of present invention implement an image processing program, an image processing apparatus, an image processing method and an image processing system capable of performing drawings in varied manners every time and in a manner that a subject, etc. of the image can be contrasted.

Features, aspects and advantages of example embodiments of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is an illustrative view explaining a relationship between an original image and sections, FIG. 6(A) shows the original image, and FIG. 6(B) shows a plurality of sections obtained by dividing the original image;

FIG. 7 is an illustrative view showing a distance d from the section to the center of the original image, a parameter D relating to a distance from the pixel to the center of the original image, and border lines B1, B2 of the probabilities;

FIG. 8 is an illustrative view showing a table to be referred in setting probabilities and correcting, FIG. 8(A) shows a probability table, and FIG. 8(B) shows a magnification table;

FIG. 9 is an illustrative view showing data structure utilized in the image processing, FIG. 9(A) shows noticeable pixel data, and FIG. 9(B) shows noticeable section data;

FIG. 10 is an illustrative view showing an image which has undergone image processing (color addition and drawing), and shows contingency of the arrangement of the objects based on the probabilities by comparing FIG. 10(A) and FIG. 10(B);

FIG. 11 is an illustrative view for clarifying characteristics of the image processing in comparison with FIG. 10, FIG. 11(A) shows a case that setting of a probability in correspondence with the distance is not performed, and FIG. 11(B)

Figure 12:
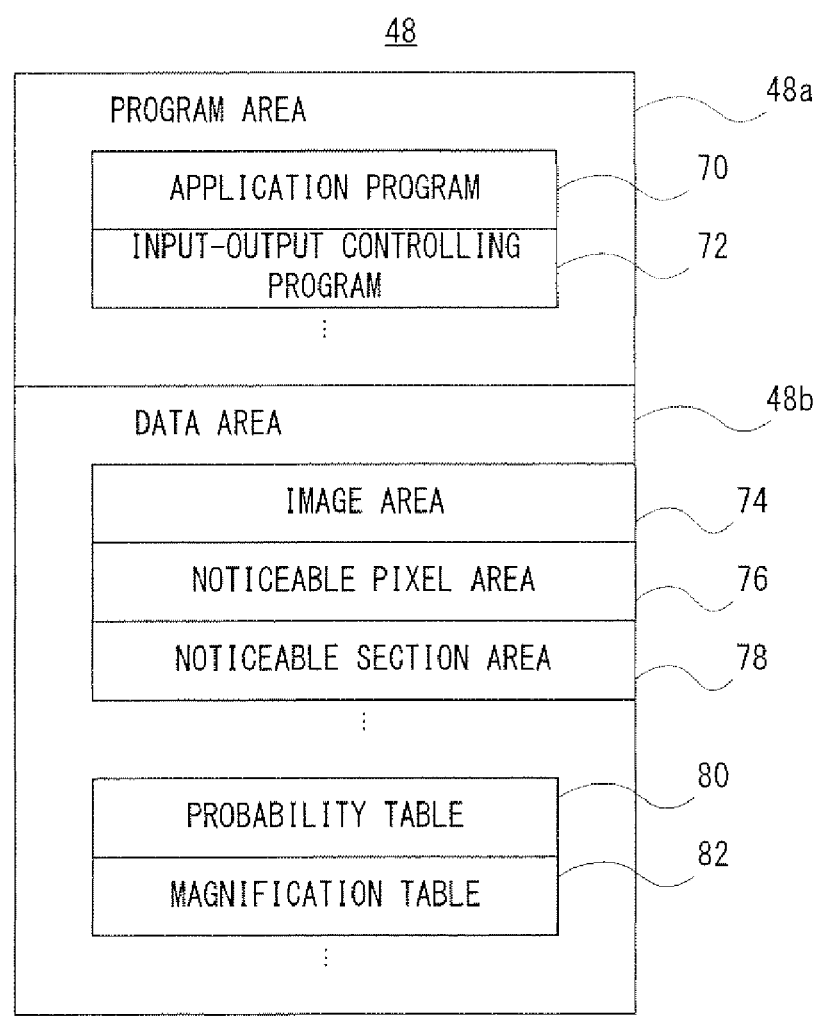
Figure 13:
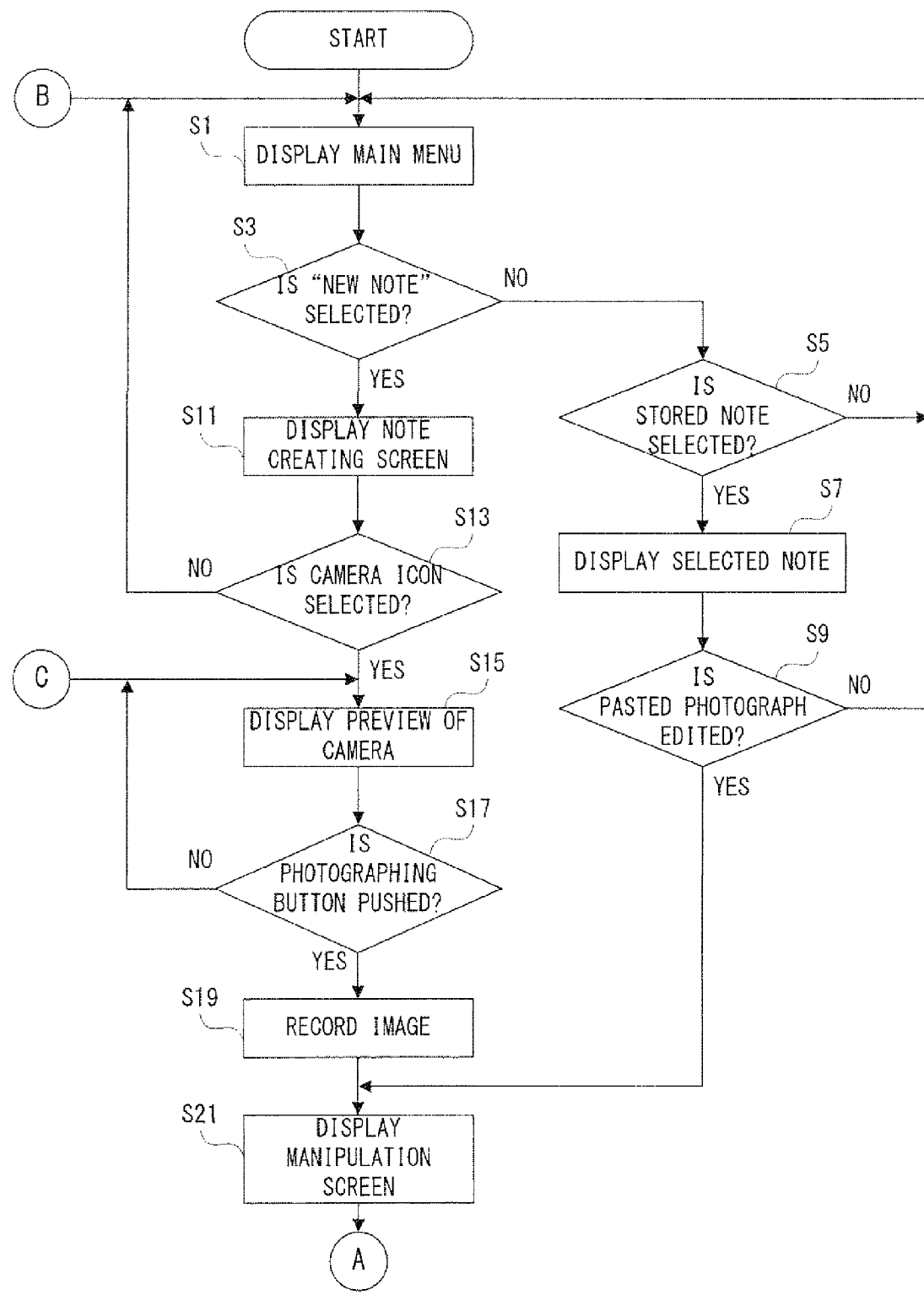
Figure 14:
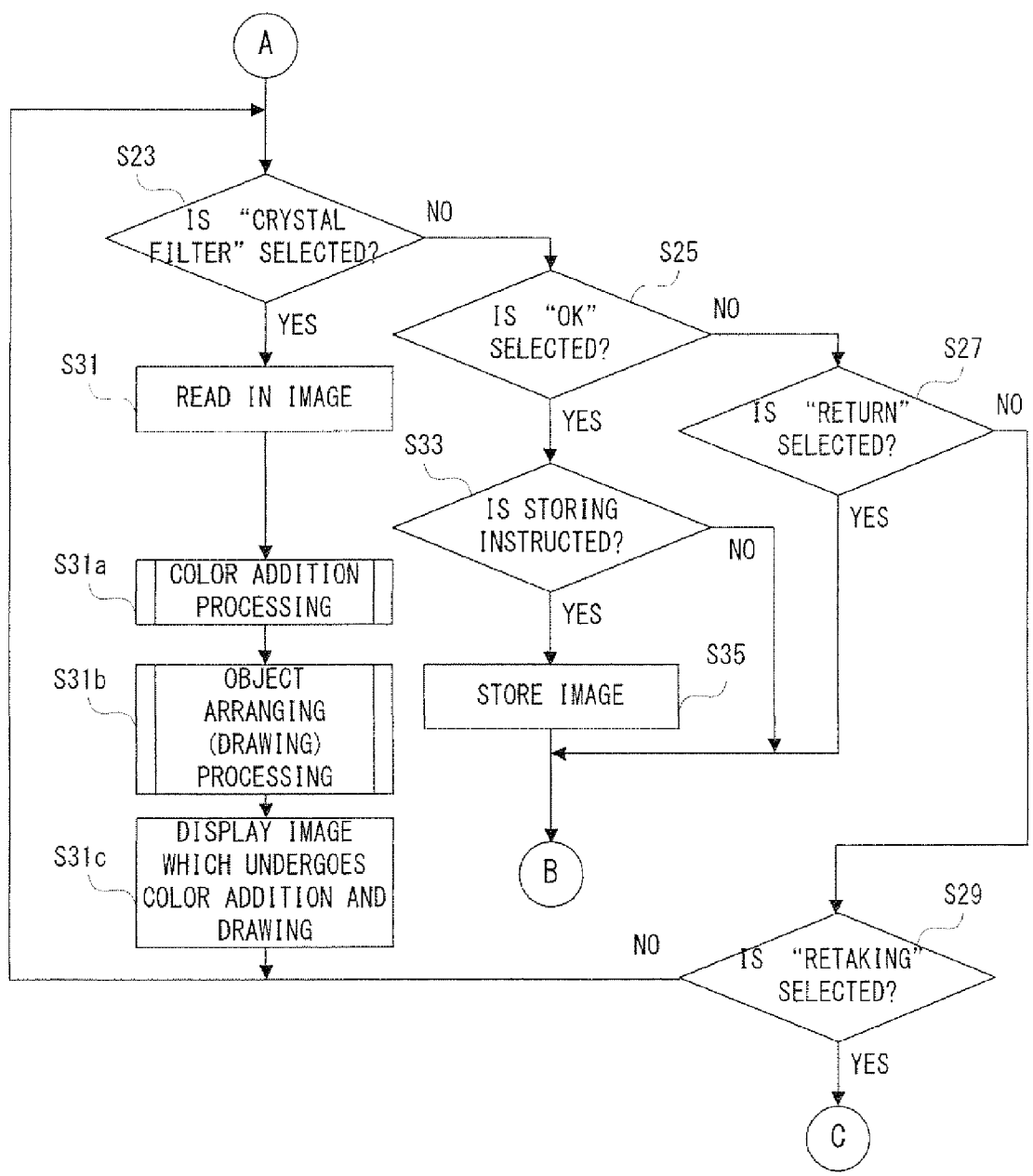
Figure 15:
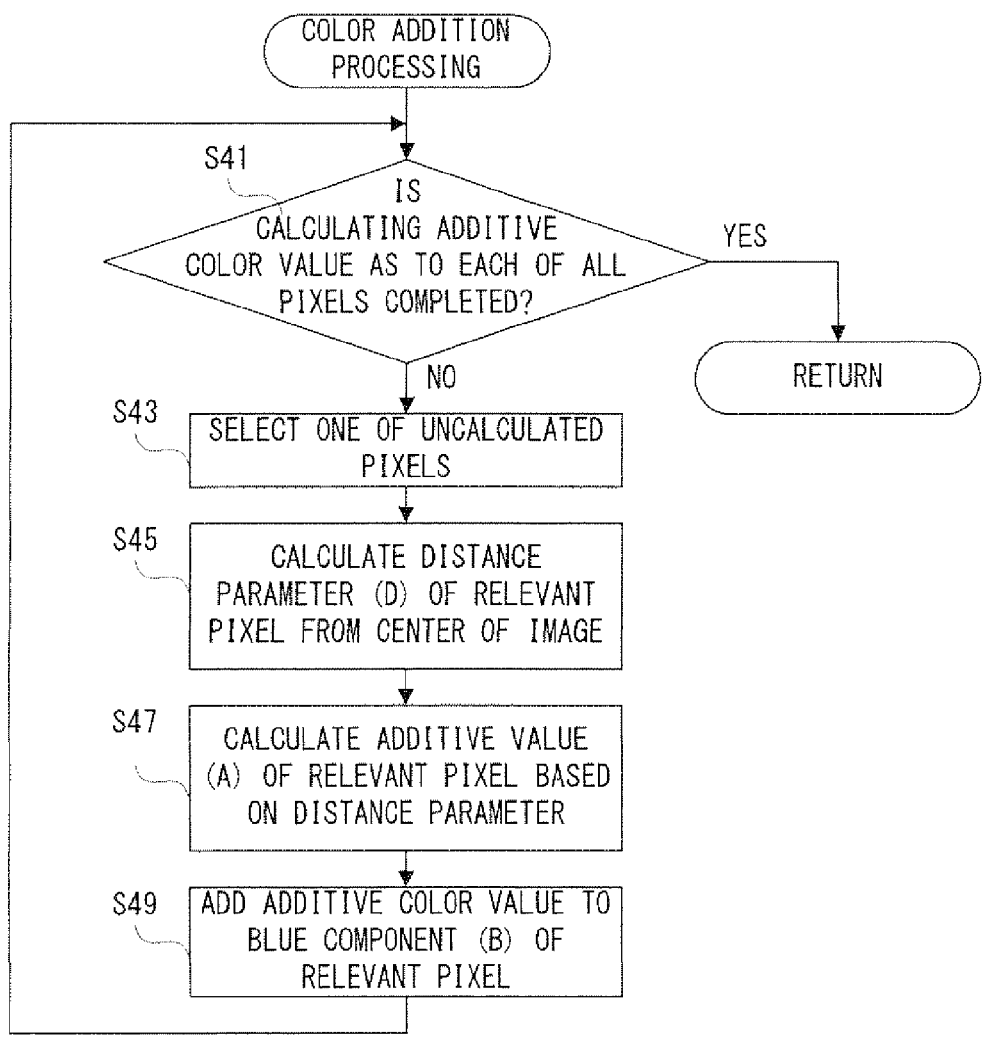
Figure 16:
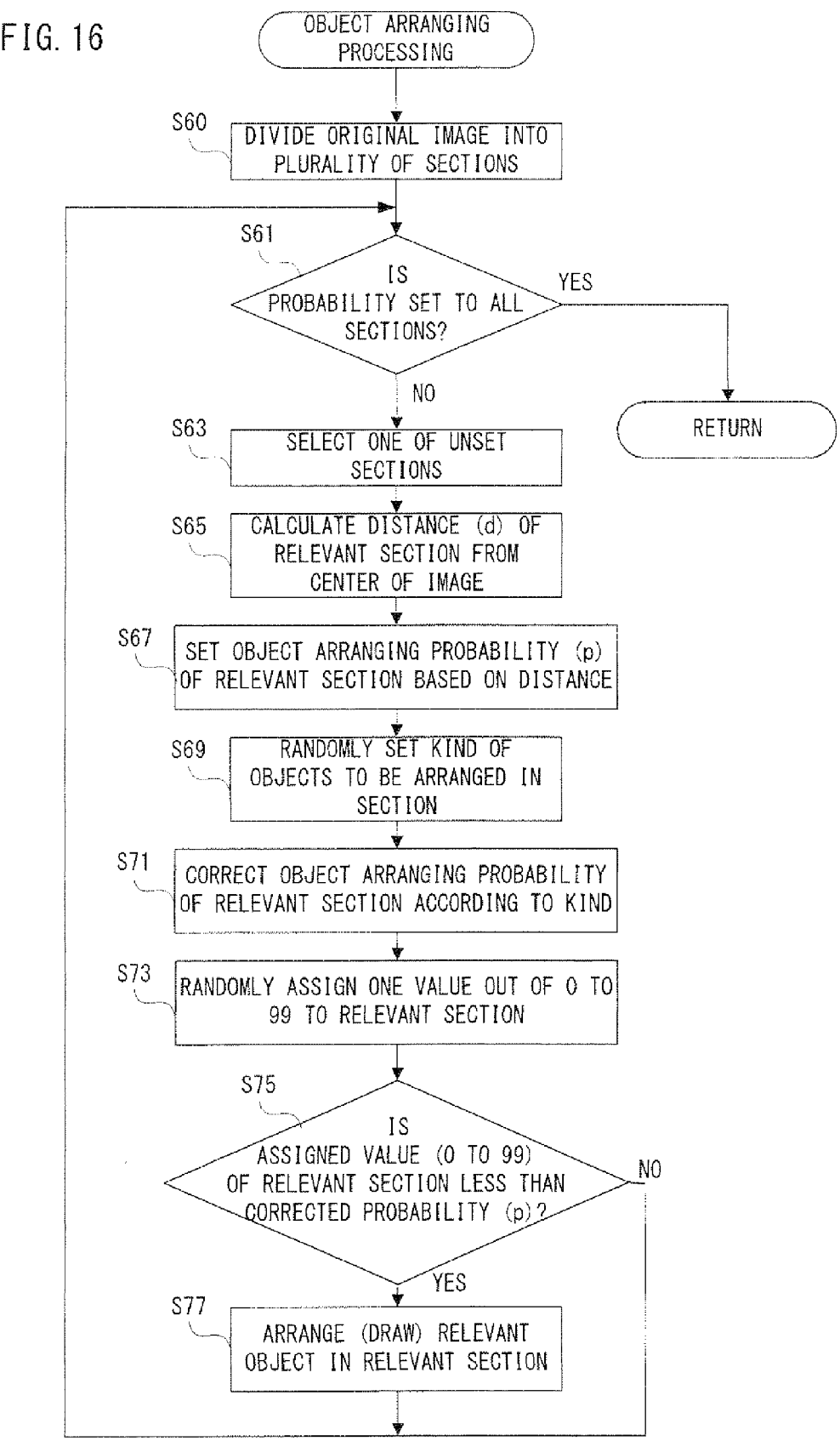
Figure 19:
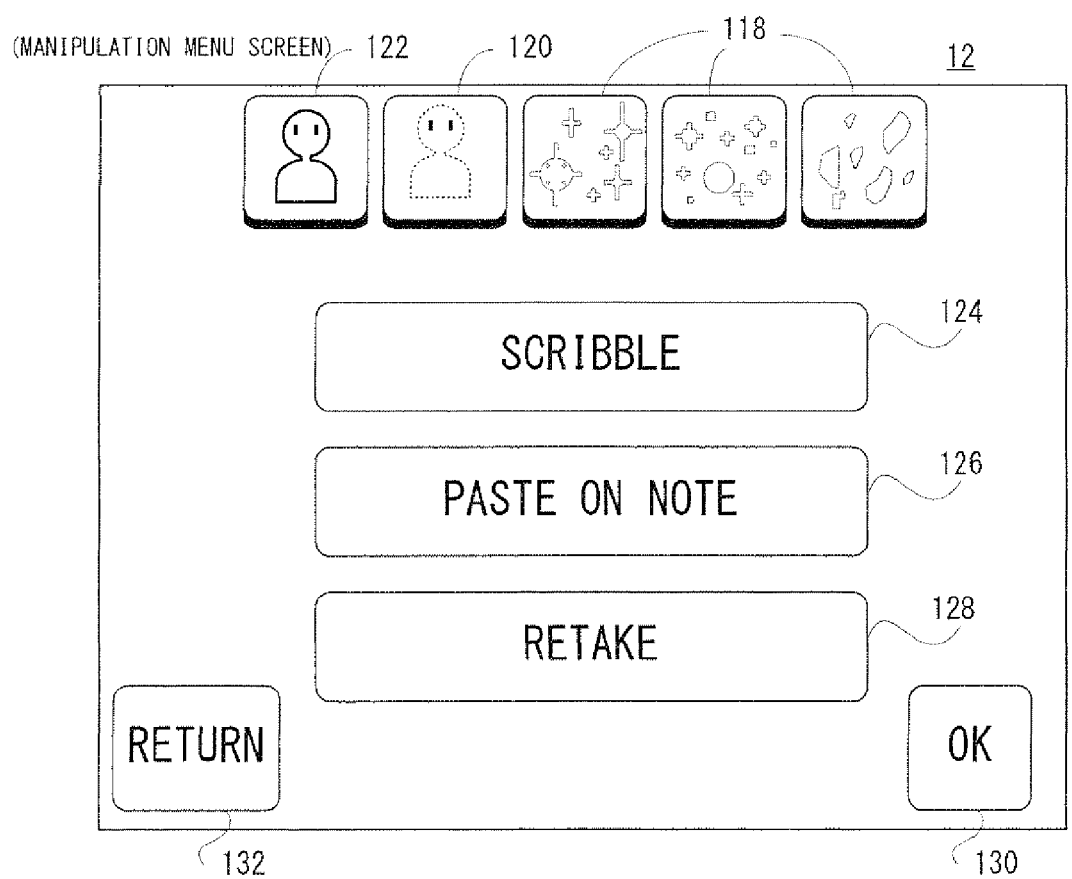

shows a case that setting of a probability in correspondence with the distance and a probability correction according to the kind are not performed;

FIG. 12 is an illustrative view showing a memory map of a main memory;

FIG. 13 is a flowchart showing a part of an operation by a CPU;

FIG. 14 is a flowchart showing another part of the operation by the CPU;

FIG. 15 is a flowchart showing a still another part of the operation by the CPU;

FIG. 16 is a flowchart showing a further part of the operation by the CPU;

FIG. 17 is an illustrative view showing one example of a main menu screen;

FIG. 18 is an illustrative view showing one example of a note creating screen;

FIG. 19 is an illustrative view showing one example of a manipulation menu screen; and FIG. 20 is an illustrative view showing a modified example in relation to border lines B1, B2 shown in FIG. 7, FIG. 20(A) shows a border line in parallel with a y axis, FIG. 20(B) shows a border line in parallel with an x axis, and FIG. 20(C) shows a border line in parallel with both of the axes (that is, rectangular or square).

DETAILED DESCRIPTION OF THE EXAMPLE EMBODIMENTS

Figure 1:
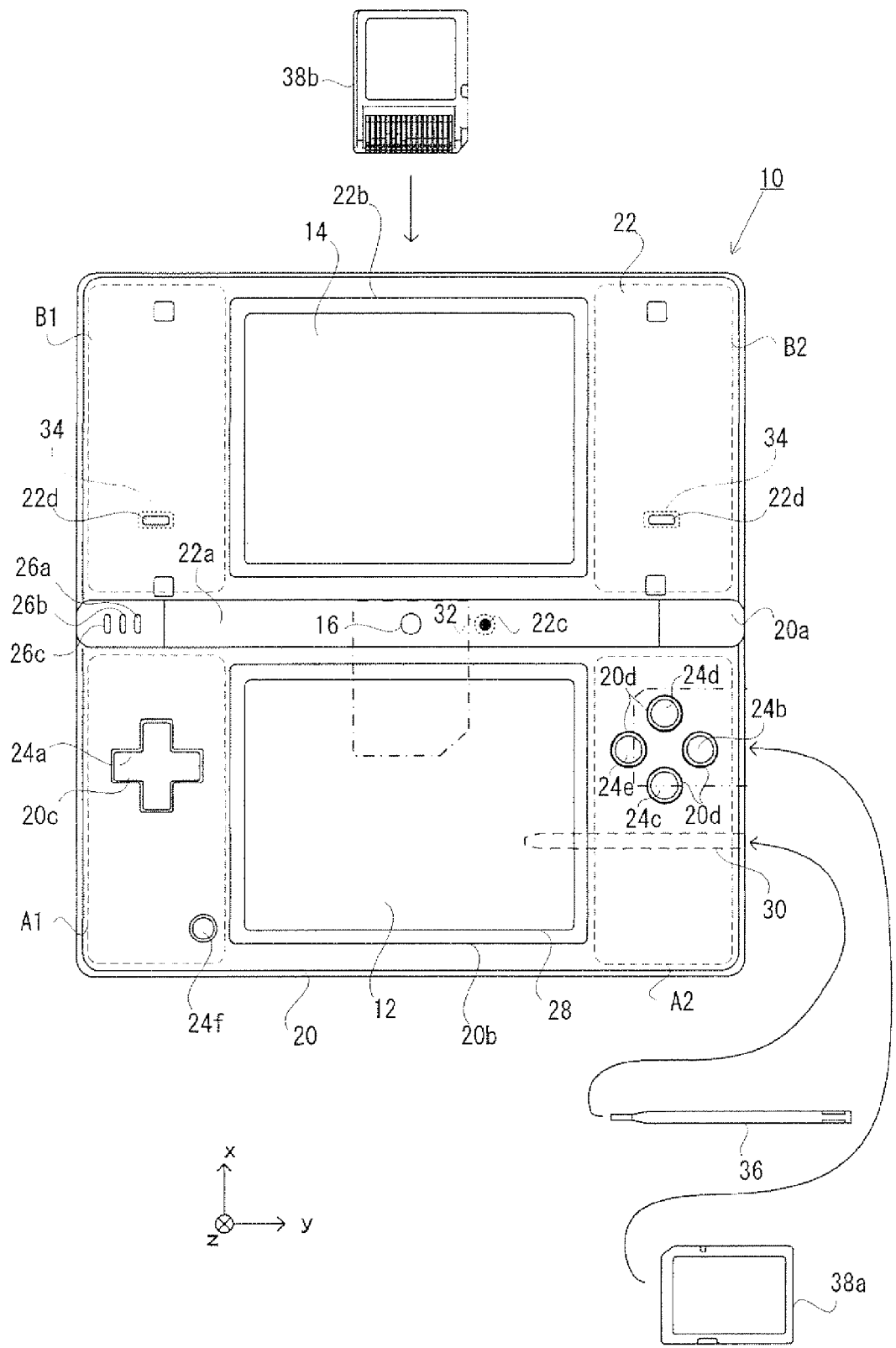
FIG. 1 is an external view of a game apparatus of one embodiment of the present invention, and shows a front surface in an open state.
Figure 2:
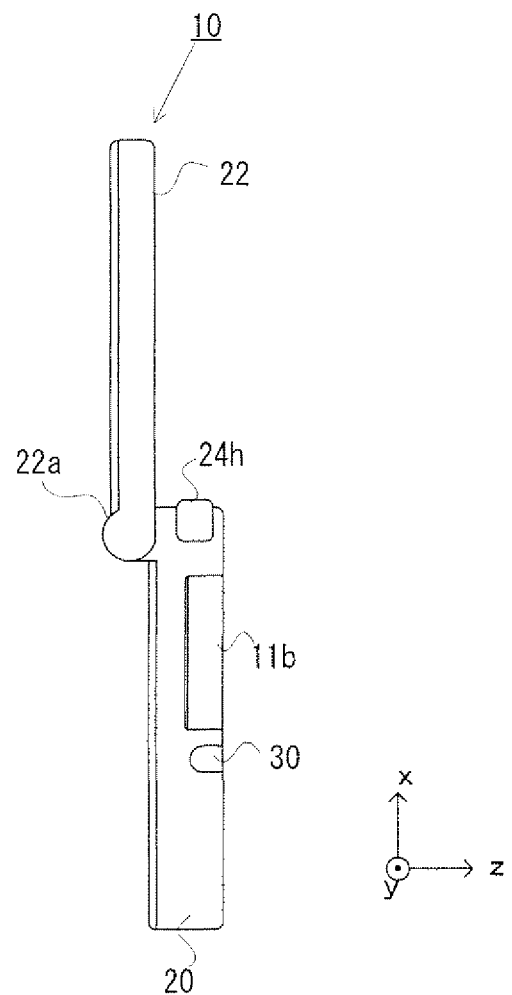
FIG. 2 is an external view of the game apparatus, and shows a side surface thereof in the open state.
Figure 3:
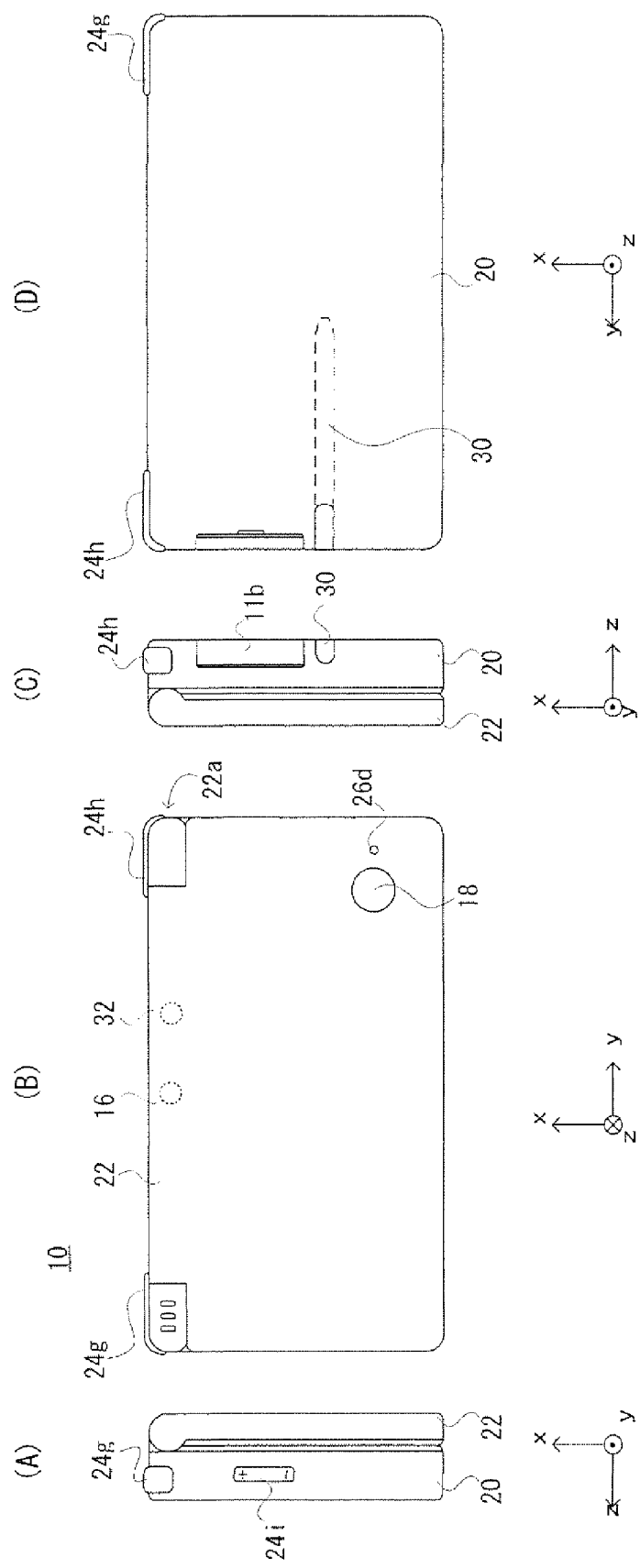
FIG. 3 is an external view of the game apparatus.

In FIG. 1 to FIG. 3, an external view of a game apparatus 10 of one embodiment of the present invention is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both of the hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electra Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a to 24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a to 24e; button arranging area) are provided.

On the lower housing 20, the respective buttons 24a to 24i and a touch panel 28 are provided as input devices. As shown in FIG. 1, the direction input button 24a, the button 24b, the button 24c, the button 24d, the button 24e, and the power button 24f out of the respective buttons 24a to 24i are provided on the inner surface of the lower housing 20. The direction input button 24a is utilized for a selecting operation, for example, and the respective buttons 24b to 24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b to 24e are provided at the other side (right side in FIG. 1) of the lower LCD 12. The direction input button 24a and the buttons 24b to 24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(B), the button 24h is provided at the right corner of the upper side surface of the lower housing 20. The button 24g is provided at the left corner of the upper side surface of the lower housing 20. The both of the buttons 24g and 24h are utilized for performing an imaging instructing operation (shutter operation) on the game apparatus 10, for example. Alternatively, both of the buttons 24g and 24h may be made to work as shutter buttons. In this case, a right-handed user can use the button 24*h*, and a left-handed user can use the button 24*g*, capable of improving usability for both of the users. Additionally, the game apparatus 10 can constantly make both of the buttons 24*g* and 24*h* valid as shutter buttons, or the game apparatus 10 is set to be a right-handed use or a left-handed use (the setting is input by the user according to a menu program, etc. and the set data is stored), and when the right-handed use is set, only the button 24*h* is made valid, and when the left-handed use is set, only the button 24*g* may be made valid.

As shown in FIG. 1, the game apparatus 10 is further provided with the touch panel 28 as an input device other than the respective operation buttons 24*a* to 24*i*. The touch panel 28 is set on the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 2 and FIG. 3(C), on the right side surface of the lower housing 20, an openable and closeable cover portion 11*b* is provided. Inside the cover portion 11*b*, a loading slot (dashed line) for loading a memory card 38*a* and a connector (not illustrated) for electrically connecting the game apparatus 10 and the memory card 38*a* are provided. The memory card 38*a* is detachably attached to a connector. The memory card 38*a* is used for storing (saving) image data imaged by the game apparatus 10, for example.

Furthermore, on the top surface of the lower housing 20, a loading slot (chain double-dashed line) 38*b* for loading a memory card and a connector (not shown) for electrically connecting the game apparatus 10 and the memory card 38*b* are provided. The memory card 38*b* is utilized for storing a program operated in the game apparatus 10, for example.

Figure 5:
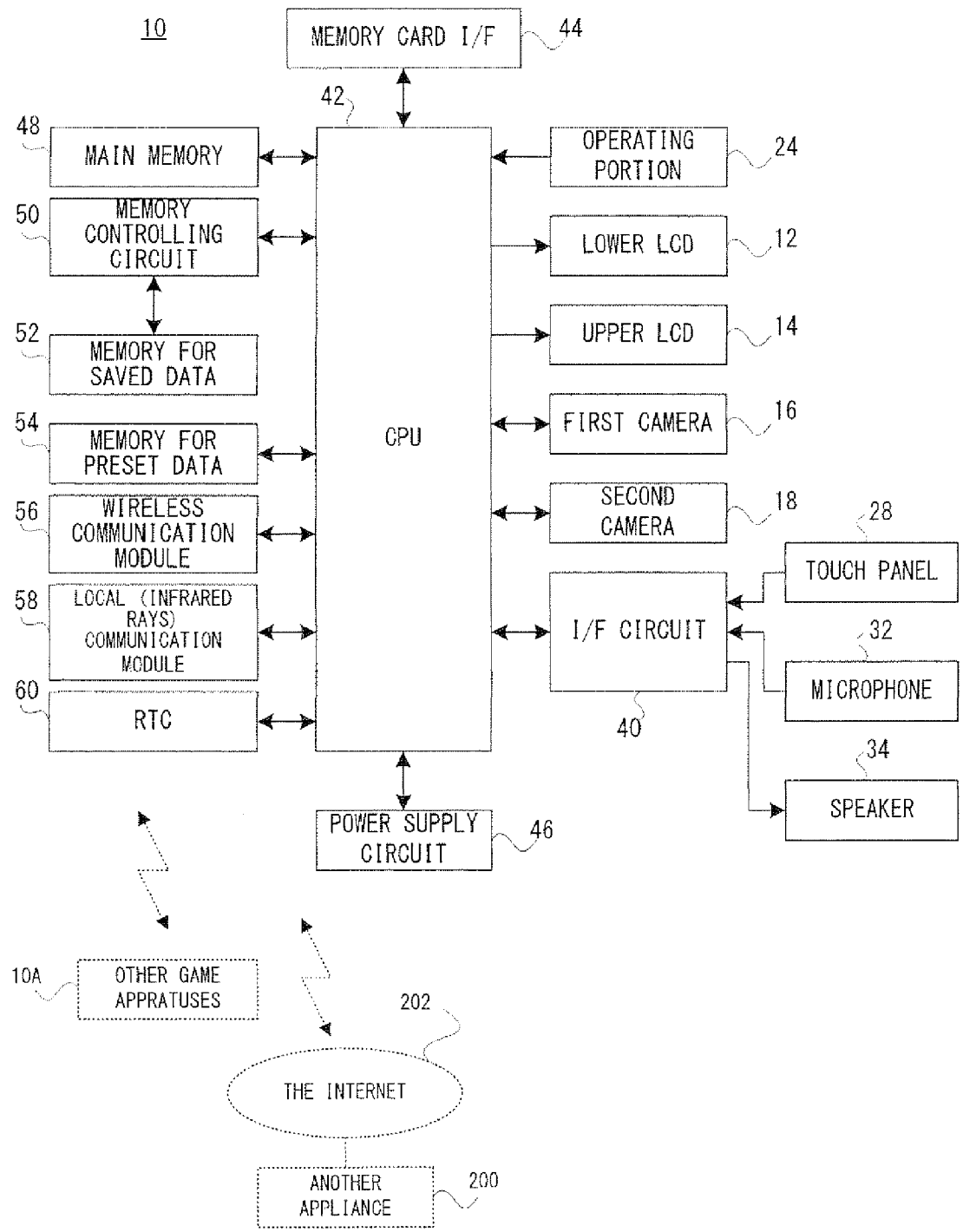
FIG. 5 is a block diagram showing one example of an electric configuration of the game apparatus.

As shown in FIG. 1, at the left of the shaft portion 20*a* of the lower housing 20, three LEDs 26*a* to 26*c* are attached. Here, the game apparatus 10 can perform a wireless communication with another appliance and another game apparatus (200, 10A: FIG. 5) in the same kind (not shown), and the first LED 26*a* lights up when a wireless communication is established. The second LED 26*b* lights up while the game apparatus 10 is recharged. The third LED 26*c* lights up when the main power supply of the game apparatus 10 is turned on. Accordingly, by the three LEDs 26*a* to 26*c*, it is possible to inform the user of a communication-established state, a charge state, and a main power supply on/off state of the game apparatus 10.

Figure 4:
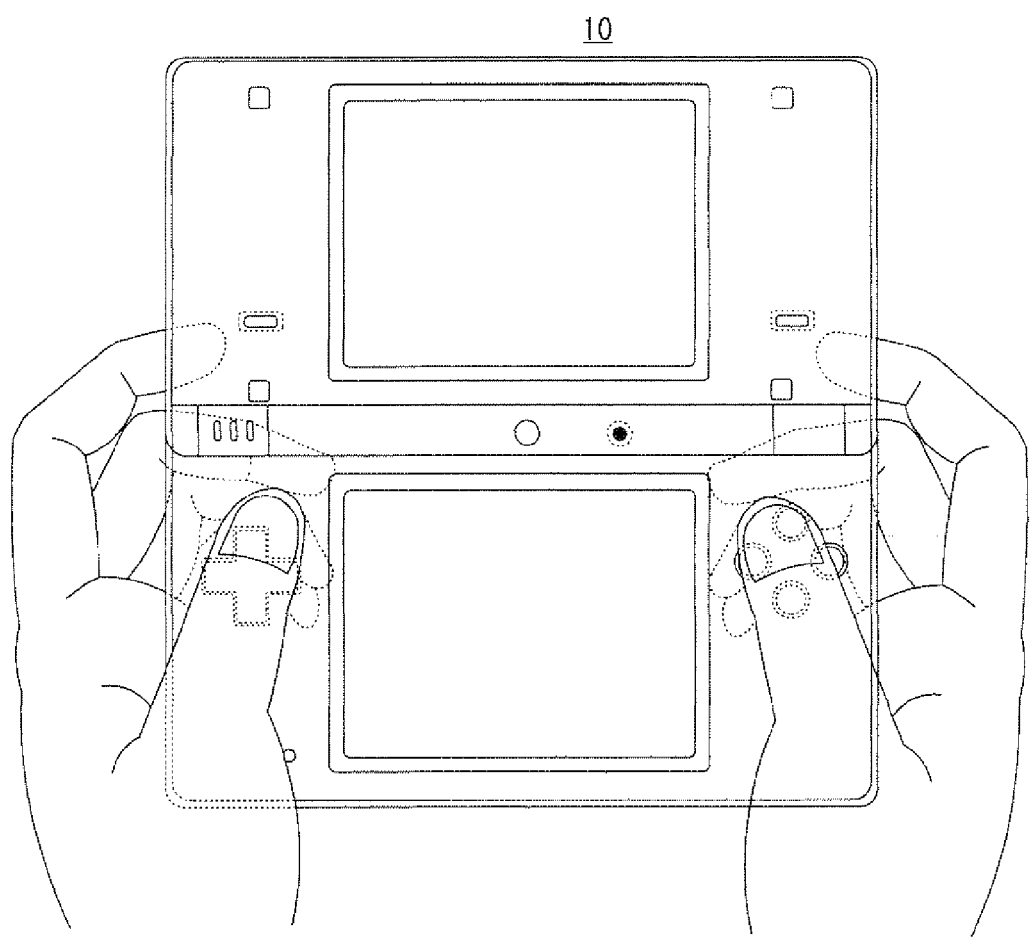
FIG. 4 is an illustrative view showing a state that the game apparatus is held by the user.

As described above, the lower housing 20 is provided with the input device (touch panel 28 and respective buttons 24*a* to 24*i*) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24*a* to 24*e* with the thumbs, and perform operations as to the buttons 24*g* and 24*h* with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 22 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22*a* formed at the center of the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22*a* of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22*c* is mounted to the shaft portion 22*a* at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22*c* is provided on the inner surface of the lower housing 20, specifically, at the lower left (button arranging area A1) of the inner surface of the lower housing 20, and the microphone 32 may be arranged in the vicinity of the through hole for microphone 22*c* within the lower housing 20. In addition, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the z axis). Thus, a sound generated within the imaging range of the inward camera 16 is suitably acquired by the microphone 32. That is, detection of a sound input through the microphone 32 and detection of the user by the imaged image by the inward camera 16 can be simultaneously performed, and accuracy of the detections can be improved, at the same time.

As shown in FIG. 3(B), on the outer surface of the upper housing 22, a fourth LED 26*d* is attached. The fourth LED 26*d* is attached around the outward camera 18 (at the right side of the outward camera 18 in this embodiment). The fourth LED 26*d* lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26*d* light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22*b* for exposing the upper LCD 14 is formed. The screen of the upper LCD 14 housed inside the upper housing 22 is exposed from the opening 22*b*. Furthermore, on both side of the aforementioned opening 22*b*, a sound release hole 22*d* is formed one by one. Inside the sound release hole 22*d* of the upper housing 22, a speaker 34 is hosed. The sound release hole 22*d* is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 22*b* set at the center of the upper LCD 14. The two sound release holes 22*d* are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for displaying the imaged image. On the other hand, the lower housing 20 is provided with the input device (touch panel 28 and respective buttons 24*a* to 24*i*) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input over the microphone 32, and the game apparatus 10 can execute the game processing and application processing other than the game on the basis of the microphone input information as well.

FIG. 5 is a block diagram showing an internal configuration (electronic configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 60, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processor to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38*b*, and may be acquired from another appliance (200, 10A), etc. by communicating with this another appliance (200, 10A), etc.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the application processing, and stores a program obtained from the outside (memory cards 38*b*, another appliance 200, 10A, etc.) In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory cards 38a and 38b attached to the connector according to an instruction from the CPU 42. In this embodiment, the image data imaged by the respective cameras 16 and 18 is written to the memory card 38a, and the image data stored in the memory card 38a is read from the memory card 38a and stored in the memory for saved data 52. Furthermore, the program and the data stored in the memory card 38 are read to transfer it to the main memory 48.

The wireless communication module 56 has a function of connecting a wireless LAN compliant with IEEE802.11b/g standards, for example. Furthermore, the local communication module 58 has a function of performing a wireless communication with the same types of the game apparatuses by a predetermined communication system, such as an infrared communication. The wireless communication module 56 and local communication module 58 are connected to the CPU 42. The CPU 42 can send and receive data over the Internet 202 with other appliances 200 by means of the wireless communication module 56, and can send and receive data with the same types of other game apparatuses 10A by means of the local communication module 58.

It should be noted that the local communication module 58 is contained in the game apparatus 10 in this embodiment, but may be provided to the memory card 38b. In this case, the CPU 42 performs a control of the communication via the memory card I/F 44.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user to output a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38a via the memory card I/F 44 as required). Furthermore, the audio data (microphone input information) stored in the sound area is also utilized for various game processing. The touch panel controlling circuit performs reading of a signal from the touch panel 28 and generating touch position data every predetermined time period. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a to 24i, and connected to the CPU 42. The operation data indicating an input state (whether or not to be pushed) with respect to each of the operation buttons 24a to 24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38a via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

When an image management application of this embodiment is executed in the game apparatus 10 constructed as described above, image processing of adding a color such as blue and arranging (drawing) objects such as a snow crystal can be performed on an image (original image 100) read from each camera 16, 18 and an image read from the memory card 38a, etc. Here, in the image processing, in place of or in addition to drawing the object, effects, such as sharpness, blur, backlight filter, etc. can be added. The processing including this color addition and drawing is explained in detail below.

The original image 100 as an object which undergoes image processing has a size including 216 pixels in a lateral (x) direction and 160 pixels in a longitudinal (y) direction (216×160) as shown in FIG. 6(A). Each pixel (0, 0)-(215, 159) includes three color components like R (red), G (green) and B (blue). Each color component is represented by 0-31 (5 bits). Here, the size of the original image 100 is not restricted to 216×160, and may be an appropriate value, 180×120, and 432×320, for example.

As to each pixel (0, 0)-(215, 159) making up of such an original image 100, an additive color value A in correspondence with a distance from a predetermined position, here, the center C (see FIG. 7) of the original image 100 is calculated, and it is added to at least one color component, for example, a B (blue) component of the pixel. By the additive color processing, a pixel in the original image 100 is high in a tincture of blue as it is far from the center C.

It should be noted that the additive color processing is not restricted thereto, and a pixel in the original image 100 is high in a tincture of blue as it is nearer to the center C, for example. Additionally, the color to be added may be red or green over blue. There is no need of being restricted to a single color, and by adding two colors, red and green, for example, a yellow tinge can be taken on. Furthermore, the predetermined position is not restricted to the center C of the original image 100, and may be an arbitrary position within the original image 100. Under certain circumstances, the predetermined position can be defined outside the original image 100.

The additive color value A is specifically calculated in the following manner. As shown in FIG. 7, the size of the original image 100 shall be w×h, the coordinates of the noticeable pixel P shall be (x, y), and a parameter D in relation to the distance from the center C to a noticeable pixel P is calculated from the following (equation 1).

$$D=\{(x-w/2)2 \times k1\}+\{(y-h/2)2 \times k2\} \quad \text{(Equation 1)}$$

Here, coefficients k1 and k2 respectively multiplied with the first term and the second term of the right side are for performing color addition in a uniform ratio in the vertical and horizontal direction on the original image 100 of 216× 160 (gradation is flatten), and an arbitrary value (k1=1.0, k2=1.35, for example) is selected therefor in correspondence with a horizontal to vertical ratio (1.35:1) of the original image 100. Here, in place of the value in correspondence with the horizontal to vertical ratio of the original image 100, a value in correspondence with a horizontal to vertical ratio of the screen (display area for displaying the original image 100) may be selected. For example, in a case of the screen with the horizontal to vertical ratio of 1.75:1, k1=1.0, k2=1.75. Here, the coefficients k1 and k2 may not match the horizontal to vertical ratio, and may be selected irrespective of the horizontal to vertical ratio.

Furthermore, assuming that the calculation is made as w=216, h=160, k1=1.0, k2=1.35, the range of the parameter D becomes $0 \leq D \leq 20304$.

Tat is, the parameter D is a minimum value (0) at the center of the image (108, 80), takes a larger value toward the corners of the images, takes a maximum value at the corners of the image.

Next, a predetermined value (4500, for example) is subtracted from the parameter D (D=D−4500). Here, if the subtracted parameter D is lower than a lower limit (that is, 0) of the B component (D<0), this is taken as the lower limit (D=0). This subtraction is processing for preventing a blue component from being added within a constant distance from the center of the image 100 (inside an oval or a circle) (see FIG. 10, FIG. 11).

Then, the subtracted parameter D is divided by a predetermined value (900, for example) (D=D/900). Here, if the divided parameter D is above an upper limit of the B component (that is, 31) (D>31), this is taken as the upper limit (D=31). This division is processing for appropriately changing the depth of the blue added to the original image 100 (one color component can have a 32-level values from 0-31, so that the value of parameter D is adjusted to fall in 0-31, and pale blue is adjusted to change to dark blue toward the outside edge from the center C of the original image 100).

Then, the parameter D which has undergone a series of subtraction and division is taken as an additive color value A (A=D), and the additive color value A is added to the B component (B=B+A). Here, if the added B component is above the upper limit (that is, 31) (B>31), this is taken as the upper limit (B=31).

It should be noted that in place of the additive color value A being calculated based on the parameter D, the additive color value A may be calculated based on the distance itself between the two points CP. The distance between the two points CP can be calculated in an equation the same as that described later (Equation 2). Here, in this case as well, the additive color value A has to be adjusted to fall in the range of 0-31, that is, 32 levels altogether.

The CPU 42 performs the aforementioned series of calculations on each pixel, and creates data (noticeable pixel data) as shown in FIG. 9(A) as to a currently noticeable pixel. The noticeable pixel data includes a pixel number, the distance parameter (D) and the additive color value (A). The noticeable pixel generally moves from an upper left of the original image 100 to the lower right thereof in an order according to so called a raster scan. Thus, in the noticeable pixel data, (0, 0) is described as a pixel number, D=20304 is described as a distance parameter, and A=17.56 is described as an additive color value, at first. The CPU 42 adds A=17 or 18 to the B component of the noticeable pixel (0, 0) with reference to the noticeable pixel data. Here, the value after the decimal point may be rounded down, rounded up, or rounded off.

When the noticeable pixel moves from (0, 0) to (1, 0), the noticeable pixel data is updated, and the updated A is added to the B component of the noticeable pixel (0, 1). Hereafter, similar processing is repeated until the noticeable pixel reaches (215, 159).

The original image 100 is divided into a plurality of sections 106, for example, 54×40 for drawing objects in a manner shown in FIG. 6(B). Here, in a case that each section 106 is identified, a section (1, 1)-(54, 40) is described.

Here, in a case of FIG. 6(B), each section 106 has a size of 4×4, but may take an arbitrary size, for example, 8×8, 2×2, etc. The shape is not restricted to a square, and may be a rectangle of 4×2, etc. Sections being different in size and shape may be mixed. Furthermore, the larger the original image 100 is, the larger the section 106 may be, and therefore, similar objects can be arranged even as to the large original image 100 or the small original image 100 when seen entirely. Alternatively, the section 106 may be changed by the size of the object, but in this case, the size of the section has to be decided before the object arranging processing is started.

Next, as to each section 106, a probability p in correspondence with the distance from the predetermined position, here, the center C of the original image 100 is set. More specifically, assuming that the size of the original image 100 is w×h, the coordinates of the center Q of the section 106 is (x, y) as shown in FIG. 7, and the distance d between the two points CO is calculated according to a following (Equation 2).

$$d=\sqrt{\{(x-w/2)2+(y-h/2)2\}} \quad \text{(Equation 2)}$$

Here, in an example shown in FIG. 7, the center C is coincident with a barycenter (intersection point of the diagonal) of the original image 100, and the center Q is coincident with a barycenter of the section 106, but both of them need not be coincident with the barycenters, and the center C is defined at an arbitrary position within the original image 100, and the center Q may be defined at an arbitrary position within the section 106.

The probability p is set to three levels as in 1% when $0 \leq d \leq 60$, 2% when $61 \leq d \leq 80$, and 5% when $81 \leq d$ according to a probability table shown in FIG. 8(A). Concentric circles B1 and B2 shown in FIG. 7 indicate border lines of the probability in this case. Accordingly, the probability p is 1% inside the concentric circle B1 is 2% at the space between the concentric circles B1 and B2, and is 5% outside the concentric circle B2. Here, the probability p is not restricted thereto, and may be set to two levels or four levels or more. In addition, in place of a stepwise value being set with reference to the probability table, etc., a continuous value may be set by utilizing a function.

Thus, the arrangement of the object within the original image 100 can be controlled. That is, according to the probability table shown in FIG. 8(A), the nearer the section 106 is to the center C, the lower (smaller) the probability p is, and therefore, the objects (Obj1-Obj3) are hard to be arranged at the center C or in the vicinity thereof. On the contrary, the further the section 106 is to the center C, the higher (larger) the probability (p) is, and the objects (Obj1-Obj3) are easy to be arranged at the center C or in the vicinity thereof.

Next, the kind of the object to be arranged there is set for each section 106. Here, snow crystals (see FIG. 10, FIG. 11) of three sizes, such as large, middle, and small are prepared as arrangeable objects, and one of them can be selected at random on the basis of a random number, for example.

Then, a probability p set to each section 106 as described above is corrected depending on the kind of the object thus set to each section 106. For example, according to the magnification table shown in FIG. 8(B), if an object at a certain section 106 is the snow crystal (large), the probability p of the section 106 is halved. Similarly, if the object is the snow crystal (middle), the probability p is the same, and if the object is the snow crystal (small), the probability p is doubled.

Thus, by correcting the probability p depending on the kind of the object (specifically, size), a ratio (degree of density) of each of objects arranged within the original image 100 can be controlled. For example, according to the magnification table shown in FIG. 8(B), the snow crystals of three kinds, such as large, middle, small generally appear at a ratio of 1:2:4, and this enhances a visual balance. Furthermore, the large snow crystals are halved while the small snow crystals are doubled, and this makes it possible to prevent the crystals from being overlapped with each other with the total number of crystals maintained.

Next, any one of values 0-99 is randomly assigned to each section 106. Then, whether or not the assigned value is below the probability p is determined for each section 106, and drawing an object is performed on the section 106 for which the assigned value is below the probability p. Thus, the object is consequently drawn at the ratio according to the probability p set to each section 106.

The CPU 42 performs the aforementioned series of calculations on each section, and thus creates data (noticeable section data) as shown in FIG. 9(B). The noticeable section data includes a section number, a distance (d), a probability (p), a kind of the object, and an assigned value. The noticeable section also moves in an order according to a raster scan, and therefore, (1, 1) is first described in the noticeable section data as a section number, and the distance and the probability are calculated as to the section (1, 1). Then, d=132 is described as a distance, and p=5% is described as a probability. In addition, the kind and the assigned value of the object are randomly set, and the snow crystal (large) is described as a kind of the object, and 73 is described as an assigned value, for example. In this case, the object is the snow crystal (large), and thus, the probability is corrected from 5% to 2.5%. The CPU 42 does not perform drawing as to the section (1, 1) with reference to the noticeable section data because the assigned value 73 is above the probability 2.5%.

When the noticeable section moves from (1, 1) to (1, 2), the noticeable section data is updated. In the updated noticeable section data, (1, 2) is described as a section number, d=130 is described as a distance, and p=5% is described as a probability. Moreover, the snow crystal (small) is described as a kind of the object, and 8 is described as an assigned value, for example. In this case, the object is the snow crystal (small), and thus, the probability is corrected from 5% to 10%. The CPU 42 draws the snow crystal (small) in the section (1, 2) since the assigned value 8 is above the probability 10% with reference to the noticeable section data. Hereafter, similar processing is repeated until the noticeable section reaches (54, 40).

An example of an image which undergoes the image processing (color addition and drawing) as described is shown in FIG. 10. The images in two ways shown in FIG. 10(A) and FIG. 10(B) are images obtained under the same condition. First, FIG. 10(A) and FIG. 10(B) are common to the color addition, but are different in the arrangement of the objects. The color addition is decided for each pixel primarily, but the arrangement of the objects is based on the probability p for each section, and therefore, even if drawing is made under the same condition, a different result occurs every time.

Next, in common to FIG. 10(A) and FIG. 10(B), the probability p changes in correspondence with the distance d (as the section has a larger distance d, a smaller probability is set: see FIG. 8(A)), and therefore, the objects are scarcely arranged at the center of the image, and most of them are arranged at the periphery. In addition, the probability p changes depending on the size of the object (here, as the object is large, the magnification to be multiplied is small: see FIG. 8(B)), and therefore, the number of large objects is relatively less, and the number of small objects is relatively more.

Images for comparison are shown in FIG. 11. The image shown in FIG. 11(A) is an image obtained when setting the probability p in correspondence with the distance d (see FIG. 8(A)) is omitted in the aforementioned image processing. When FIG. 11(A) is compared with FIG. 10(A) or FIG. 10(B), in the latter, the objects are scarcely present at the center of the image irrespective of the sizes, so that, the cat at the center is increasingly visible, but in the former, some objects are arranged at the center of the image although the large objects are less and the small objects are more, so that, the cat at the center is decreasingly visible.

The image in FIG. 11(B) is an image obtained in a case that neither setting the probability p in correspondence with the distance d nor performing the probability correction (see FIG. 8(B)) depending on the kind (size) of the object is performed. When FIG. 11(B) is compared with FIG. 11(A), as to the objects at the center of the image, in the latter, the small object are more and the larger objects are less while in the former, the large, middle, and small objects are equal because of no correction, and therefore, the cat positioned at the center is more decreasingly visible.

The operation as described above is implemented by executing processing according to flowcharts shown in FIG. 13-FIG. 16 on the basis of the program and the data shown in FIG. 12 stored in the main memory 48 by the CPU 42 of the game apparatus 10.

That is, when the image management application of this embodiment is executed, a program area 48a and a data area 48b are formed in the main memory 48 as shown in FIG. 12, and an application program 70, an input-output controlling program 72, etc. are stored in the program area 48a.

The application program 70 is a main software program for implementing the image management application by controlling the various pieces of hardware (12-40, 44-60) via the CPU 42, and corresponds to the flowchart shown in FIG. 13-FIG. 16. The input-output controlling program 72 is a sub software program utilized by the application program 70, and implements a touch input, a button input, an image output by mainly controlling the LCDs 12 and 14, the operating portion 24, the I/F circuit 40, etc.

The data area 48b includes an image area 74, a noticeable pixel area 76, a noticeable section area 78, etc. In the image area 74, an original image (100: see FIG. 6(A)) to be managed or manipulated by the application program 70 is stored. The manipulated image (see FIG. 10) is also stored in the image area 74. The original image 100 to be manipulated may be overwritten with the manipulated image. Alternatively, the manipulated image may be added without overwriting.

In the noticeable pixel area 76, noticeable pixel data (see FIG. 9(A)) when an image manipulation is performed according to an image application program 70 is stored. In the noticeable section area 82, noticeable section data (see FIG. 9(B)) created when an image manipulation is performed by the application program 70 is stored.

In the data area 48b, the probability table 80 shown in FIG. 8(A) and the magnification table 82 shown in FIG. 8(B) are also stored.

Referring to FIG. 13, when the application program 70 is started-up, the CPU 42 first displays a main menu screen as shown in FIG. 17 on the LCD 12 in a step S1. On the main menu screen, three sheets of "stored note" 112 and a "new note" icon 114 are included. In each of the three sheets of the "stored note" 112, a handwritten character is described, and in any one of the sheets, a photograph 112a and a voice icon 112b are pasted.

Next, it is determined whether or not the "new note" icon 114 is selected in a step S3, and if "NO", the process shifts to a step S5 to further determine whether or not the "stored note" 112 is selected. If "NO" in the step S5 as well, the process returns to the step S1 to repeat the same processing.

When any one of the "stored notes"112 is touched on the main menu screen, "YES" is determined in the step S5, and the process proceeds to a step S7. In the step S7, the selected "stored note" is displayed on the LCD 12, and in a next step S9, it is determined whether or not editing the pasted photograph 112a is to be performed. If any photograph 112a is selected, the process proceeds to a step S21 (described later). If the photograph 112a is not pasted to the selected "stored note" 112, if the voice icon 112b is selected, or if a canceling operation is performed, "NO" is determined in the step S9, and the process returns to the step S1. Although not illustrated, in a case that the voice icon 112b is selected, a corresponding voice (voice memo) is output from the speaker 34.

When the "new note" icon 114 is selected on the main menu screen, "YES" is determined in the step S3, and the process proceeds to a step S11. In the step S11, the note creating screen as shown in FIG. 18 is displayed on the LCD 12. On the note creating screen, a "pencil" icon 116a, an "eraser" icon 116b, a "camera" icon 116c, a "microphone" icon 116d, etc. are included.

Next, in a step S13, it is determined whether or not the "camera" icon 116c is selected, and if "YES", the process proceeds to a step S15 whereas if "NO", the process returns to the step S1. Here, that "NO" is determined in the step S13 is a case that the icon (116a, 116b or 116d) other than the "camera" is selected, or a canceling operation is performed. Although not illustrated in the drawings, in a case that the icon other than "camera" is selected, after processing corresponding to the selected icon (handwriting input, cancellation of an input, sound input, option setting, etc.) is executed, processing such as storing, etc. is performed, and then, the process returns to the step S1.

In the step S15, a preview (through image from the camera 16 or 18) of the camera is displayed on the LCD 12, and in a next step S17, it is determined whether or not a photographing button (button 24b, for example) is pushed. If "NO" in the step S17, the process returns to the step S15 to repeat the same processing. If "YES" in the step S17, an image is recorded in the memory card 38a in a step S19, and the process proceeds to the step S21 to display a manipulation menu screen as shown in FIG. 19 on the LCD 12. On the upper LCD 14, the image recorded in the step S19 is displayed. The image is updated with the image which undergoes a color addition and arrangement of the objects (drawing) in a step S31c described later.

On the manipulation menu screen, three kinds of "crystal filter" icons 118, a "blur" icon 120, a "sharpness" icon 122, a "scribbling" button 124, a "pasting on a note (storing)" button 126, a "retaking" button 128, a "OK" button 130 and a "returning" button 132, etc. are included. Here, as to the three kinds of "crystal filter" icon, the shapes of objects drawn in the image processing (snow crystals and petals, even in the same snow crystal, hexagonal, cross, etc.) are merely different, and thus, they are not especially identified one from another below.

Referring to FIG. 14, through a loop from steps S23 to S29, it is determined which item is selected on the manipulation menu screen. More specifically, it is determined whether or not the "crystal filter" is selected in the step S23, it is determined whether or not the "OK" or the "pasting on the note" is selected in the step S25, it is determined whether or not the "return" is selected in the step S27, and it is determined whether or not the "re-taking" is selected in the step S29. If "NO" in either steps S23-S29, the processing is circulated through the loop until a canceling operation is performed.

When the "crystal filter" icon 118 is selected on the manipulation menu screen, "YES" is determined in the step S23, the original image 100 is read into the image area 74, and then undergoes a series of image processing (color addition and arrangement of the objects: see FIG. 15 and FIG. 16) corresponding to the "crystal filter" in the steps S31a and S31b. Then, the image which undergoes the color addition and the drawing (see FIG. 10(A), for example) is displayed on the LCD 12 in the step S31c, and then the process returns to the step S23. Here, the original image 100 is a camera image recorded in the step S19 or a photograph image pasted on the note, but it may be other images, such as a handwritten image, a CG image, etc.

If the user views the image displayed on the LCD 12, and is not in favor of the arrangement of the objects, he or she can perform rearrangement of the objects on the same original image 100 by selecting the "crystal filter" icon 118 on the manipulation menu screen again. The arrangement of the objects is based on the probability, and therefore, as to the image obtained by the rearrangement (see FIG. 10(B), for example), the arrangement of the objects is different from that of the previous image (see FIG. 10(A), for example). If the user is not in favor, a similar operation may be repeated until a favorite arrangement of the objects can be obtained.

When the "OK" button 130 or the "pasting on a note" button 126 is pushed on the manipulation menu screen, "YES" is determined in the step S25, and the process proceeds to a step S33 to display a dialogue to further determine whether or not storing is instructed. When the user instructs that storing is to be performed in reality, "YES" is determined in the step S33, the image is stored in a step S35, and the process returns to the step S1. On the other hand, when the user instructs that storing is not to be performed, "NO" is determined in the step S33, and the process returns to the step S1 without performing storing (discarding image).

When the "return" button 132 is pushed on the manipulation menu screen, "YES" is determined in the step S27, and the process returns to the step S1. Here, the image recorded the step S19 may be discarded. When the "retaking" button 128 is pushed, "YES" is determined in the step S29, and the process returns to the step S15.

Although not shown in the flowcharts, when the "blur", the "sharpness", or the "scribbling" is selected, image processing corresponding to each of them is executed. These processing are not a subject matter of this embodiment, and therefore, the explanation is omitted. Here, in another embodiment, in the image processing corresponding to the "blur" or the "sharpness", similar to the "crystal filter", the probability p in correspondence with the distance d from the center C of the original image 100 is set to each section 106, and the "blur" and "sharpness" can be locally added on the basis of the probability p.

The additive color processing in the aforementioned step S31a is executed according to a subroutine shown in FIG. 15 in detail. Referring to FIG. 15, the CPU 42 first determines whether or not calculating an additive color value A as to each of all the pixels in the original image 100 is completed in a step S41, and if "NO", any one of the unselected pixels is selected in a step S43. Here, selection is performed from the pixel at the upper left (0, 0) to the pixel at the lower right (215, 159), that is, in an order according to a so-called raster scan (zigzag arrow shown in FIG. 6(B)) in a case of the original image 100 shown in FIG. 6(A). The noticeable pixel data shown in FIG. 9(A) is data in relation to the selected pixel to which (0, 0) is written as a pixel number at first.

Next, in a step S45, as to the pixel, the value of the parameter D is calculated from the aforementioned (Equation 1). As to the pixel (0,0), for example, a calculation is performed as in $D=\{(0-216/2)2\times 1.0\}+\{(0-160/2)2\times 1.35\}=20304$, and this is written to the noticeable pixel data.

Next, in a step S47, the additive color value A as to this pixel is calculated on the basis of the parameter D in the aforementioned procedure. For example, as to the pixel (0, 0), 4500 is subtracted from D (=20304), the subtraction result (=15804) is divided by 900, and the division result (=17.56) is taken as an additive color value A. The additive color value (A=17.56) thus calculated is written into the noticeable pixel data.

Next, in a step S49, the additive color value A is added to the B component as to this pixel. Thus, the component of this pixel changes from (R, G, B) to (R, G, B+A). For example, if the original component of the pixel (0, 0) is (12, 8, 6), this changes to (12, 8, 23.56) after the color addition. If the original component is (12, 8, 15), 15+17.56 =32.56>31, and thus the component after the color addition is (12, 8, 31). Here, the fraction after the decimal point may be rounded down, rounded up or rounded off. These processing may be performed before the addition to the B component is performed (when writing is made into the noticeable pixel data), when the addition to the B component is performed, or after the addition is made.

Thereafter, the process returns to the step S41 to perform the similar processing. Thus, blue in correspondence with the distance from the center C is given to the original image 100 by pixels. Then, after completion of the processing as to the pixel at the end (215, 159), "YES" is determined in the step S41, and the process is restored to the main routine (FIG. 13-FIG. 14). Accordingly, at this point, the image after the color addition is stored in the image area 74.

The object arranging processing in the aforementioned step S31b is executed according to a subroutine shown in FIG. 16 in details. Referring to FIG. 16, the CPU 42 first divides the original image 100 into a plurality sections 106, 54×40 pieces, for example, in a step S60, and determines whether or not setting the probability as to all the 54×40 sections 106 shown in FIG. 6(B), for example, is completed in a next step S61, and if "NO", one of the sections which has not been set is selected in a step S63. Here, the selection is performed from the pixel at the upper left (0, 0) to the pixel at the lower right (215, 159), that is, in an order according to a so-called raster scan as shown in the zigzag arrow shown in FIG. 6(B). The noticeable section data shown in FIG. 9(B) is data as to the selected section, and (1, 1) is written as a pixel number at first, here.

Next, in a step S65, the value of the distance d is calculated from the aforementioned (Equation 2) as to the section 106. As to the section (1, 1), for example, when the coordinates of the pixel at the center Q is (2, 2), calculation is made as in $d=\sqrt{\{(2-216/2)2\}+\{(2-160/2)2\}}\approx 132$, and the calculation result (d=132) is written to the noticeable pixel data.

Next, in a step S67, the probability p is set on the basis of the distance d as to this section 106. More specifically, the probability p corresponding to the distance d is read from the probability table 80, and written to the noticeable section data. For example, as to the section (1, 1), because of d=132, p=5% corresponding to $81 \leq d$ is read from the probability table 80, and p=5 is written to the noticeable section data.

Next, in a step S69, the kind of the object is randomly set as to this section 106. Here, the snow crystals in the three sizes, such as large, middle and small are prepared as settable objects, and thus, the snow crystal in either size has about 33% of the probability to be set. For example, assuming that as to the section (1, 1), the "snow crystal (large)" is set as a kind of the object, this setting, that is, the "snow crystal (large)" is written to the noticeable section data.

Next, in a step S71, the probability p is corrected according to the kind of the object as to the section 106. More specifically, a magnification corresponding to the kind of the object is read from the magnification table 82, and the probability p is multiplied by the magnification. Then, the multiplied probability p is written to the noticeable section data as a corrected probability. For example, as to the section (1, 1), the kind of the object is the "snow crystal (large)", and therefore, "−0.5" corresponding to the "snow crystal (large)" is read from the magnification table 82, and the result (p=2.5) obtained by multiplying the probability p=5% by it is written to the noticeable section data as a corrected probability p. Here, when writing, the probability p to be corrected may be overwritten with the corrected probability p.

Next, in a step S73, any one of the values 0 to 99 is assigned at random to each of the section 106. For example, when 73 is assigned as to the section (1, 1), the assigned value, that is, "73" is written to the noticeable section data.

Next, in a step S75, it is determined whether or not the assigned value is less than the corrected probability p as to the section 106, and if "NO", the process returns to the step S61. If "YES" in the step S75, the object set to this section 106 is arranged (drawn) in a step S77, and then, the process returns to the step S61. The object, here, is arranged (drawn) such that the center thereof is coincident with the center Q of this section 106, but the centers are not necessarily coincident with each other.

As to the section (1, 1), for example, the assigned value is 73 with respect to the probability p=2.5%, and the assigned value is not less than the probability p, and therefore, drawing of the objects is not executed. Assuming that the assigned value is 8 with respect to the probability p=10%, the assigned value is less than the probability p, and therefore, the set object is drawn.

By repetitively performing such processing as to each section 106, the objects are arranged (drawn) at a probability in correspondence with the distance from the center C with respect to the image that undergoes the color addition which is stored in the image area 74. Then, when processing as to the section at the end, for example, the section (54, 40) is completed, "YES" is determined in the step S61, and the process is restored to the main routine (FIG. 13-FIG. 14). Accordingly, at this point, an image which undergoes the color addition and the drawing is stored in the image area 74.

Accordingly, in a step S31c after the restoration, the image which undergoes the color addition and the drawing stored in the image area 74 is displayed on the upper LCD 14. In other words, the original image 100 on the LCD 14 is updated with the image which undergoes the color addition and the drawing.

As understood from the above description, in this embodiment, the CPU 42 divides the original image 100 into the plurality of sections 106 (S60), calculates the distance d from the predetermined position, for example, the center C of the original image 100 for each section 106 (S65), sets the probability p in correspondence with the calculated distance d (S67), determines whether or not the section 106 is a section to be drawn for drawing the object (Obj1, Obj2, ...) according to the set probability p, (S73, S75), and performs drawing of the object in each section 106 which is determined to be a section to be drawn (S77). Thus, by changing the probability in correspondence with the distance from the predetermined position, it is possible to perform variety of drawings according to the probability irrespective of an instruction from the user.

Furthermore, the CPU 42 calculates the parameter D in relation to the distance from the predetermined position, for example, the center C of the original image 100 for each pixel (P: see FIG. 7) making up of the original image 100 (S45), and performs a color addition with respect to each pixel in correspondence with the calculated distance parameter D (S47, S49). More specifically, the additive color value A depending on the distance parameter D is calculated (S47), and the calculated additive color value A is added to at least one color component (B, for example) of each pixel (S49). Thus, color addition is performed in correspondence with the distance from the predetermined position, and whereby, it is possible to contrast the subject at the predetermined position.

Additionally, in the modified example, various types of the object (size, shape, color, brightness, transparency, flashing cycle, etc.) such as large or small stars and petals, etc. may be drawn other than the large, middle, and small snow crystals.

In addition, in stead of the objects being drawn according to probability for each section 106, effects such as a backlight filter may be added according to the probability for each section 106. Adding effects here means that the pixel value is changed by the calculation (filter arithmetic operation, etc.). Here, drawing the object is implemented by changing the pixel value, and therefore, if changing the pixel value is defined as "drawing", and a representation of "effect drawing" may be possible.

Furthermore, in this embodiment, the image imaged by each of the cameras 16 and 18 is worked as an original image 100, but the original image 100 may be the image handwritten by the touch panel 28 or various images (camera image, handwritten image, scanner image, CG image, etc.) capture from the memory card 38a through the memory card I/F 44.

Additionally, in this embodiment, a color addition is first performed, and drawing objects is performed on the image which undergoes color addition, but the objects are drawn first, and color addition may be performed on the drawn image. However, if a color is added to the drawn image, the object is also colored as a result.

Moreover, in this embodiment, while noticeable pixel data is created (renewal) for each pixel, color addition (addition to a color component) is performed, but after creating pixel data of all the pixels is created, color addition may be performed on all the pixels at a time. Similarly, in this embodiment, while noticeable section data is created (updated) for each section, drawing (arranging objects) is performed, but after section data of all the sections are created, drawing may be performed on all the sections at a time.

In addition, the border lines B1, B2 of the probability p in this embodiment are concentric circles (see FIG. 7), but in another embodiment, these may be lines which are in parallel with each other. For example, a line in parallel with a y-axis (see FIG. 20(A)), or a line in parallel with an x-axis (see FIG. 20(B)), concentric rectangle (see FIG. 20(C)) or square, that is, a combination thereof, may be appropriate.

In an example shown in FIG. 20(A), the probability p is made higher (larger) far away from the a y-axis, and thus, objects are unevenly distributed at the right of the original image 100, and in an example shown in FIG. 20(B), the probability p is made higher (larger) far away from an x-axis, and thus, objects are unevenly distributed at the lower part of the original image 100. In an example shown in FIG. 20(C), similar to the concentric circles shown in FIG. 7, the probability p is made higher (larger) far away from the center of the original image 100, and therefore, objects are unevenly distributed at the periphery of the original image 100. Then, the borders B1, B2 shown in FIG. 20(A)-FIG. 20(C) may not be in parallel and may not be straight lines unless they do not intersect with each other.

Although illustration is omitted, the border lines B1, B2 (concentric circles) in FIG. 7 may be flatten in a lateral (x-axis) or a longitudinal (y-axis) direction. For example, in correspondence with the horizontal to vertical ratio of the original image 100, the border lines B1, B2 may be ovals. This is implemented by respectively multiplying the first term and the second term by the coefficient k1 and the coefficient k2 within square roots in the aforementioned (Equation 2) in the same manner that the first term and the second term are respectively multiplied by the coefficients k1 and k2 within the square roots in the aforementioned (Equation 1).

In addition, in common to FIG. 7 and FIG. 20(A)-FIG. 20(C), the number of the border lines for the probability is not restricted to two, and one or three or more border lines may be appropriate.

Furthermore, in this embodiment, the object arranging (drawing) processing is performed by sections 106, but may be performed by pixels (that is, sections may be dealt as pixels.) Here, performing the processing by pixels increases an amount of processing while performing the processing by sections reduces an amount of processing. Furthermore, in a case that the processing is performed by sections, arbitrarily selecting the size of the section provides the advantage of ensuring the space between the objects, and therefore, the section unit which is being made up of a plurality of pixels is more suitable for this embodiment.

Here, in a case that the object arranging processing is performed by pixels, the object is apt to be successively (densely) drawn, and therefore, processing of adjusting the space between the objects can be interposed so as not to make the continuous pixels as a pixel to be drawn. Furthermore, in a case that the object arranging processing is performed by sections as well, the processing of adjusting the space between the objects can be applied when drawing is intended to be made with a longer space. As an example of the space adjusting method, a minimum distance when objects are not overlapped with each other (space equal to or less than the predetermined value is ensured) is calculated, and each object is arranged such that the distance with the center is equal to or more than the minimum distance. Additionally, as another method, the minimum distance is similarly calculated, and the position (objective pixel) of the object is decided once, if another two or more objective pixels are present within the minimum distance from the objective pixel, any one of them is left and the rest of them is erased (is moved outside the minimum distance).

Moreover, in this embodiment, the kind of the object to be arranged is randomly decided, but this may be decided depending on the magnitude of the probability p. For example, in a case that the probability p is high, arranging small objects reduces the overlap between the objects, enhancing the appearance. The kind (size) of the object may be decided in correspondence with the distance d from the center Q of the section 106.

Additionally, in this embodiment, the probability p may be changed depending on the size of the object, but this may be changed by a kind (visual manner), such as a color, a shape, a pattern, brightness, transparency or the combination thereof over the size. For example, in a case that the probability p is changed by the color of the object, from objects having the same size and shape but being different in color, such as red, orange and yellow, one object is randomly selected. A correction may be made by multiplying the red object by a coefficient 0.5, by multiplying the orange object by a coefficient 1.0 (no correction), and multiplying the yellow object by a coefficient 2.0. Additionally, a correction value may be set as to objects having the same size but being different in shape (triangle, quadrangle, circle, etc.), or the probability can be changed by combining them with the size.

Moreover, in this embodiment, when the kind of the object to be arranged in each section 106 is randomly set (S67), each kind of object is selected uniformly (1/3 in a case of three kinds of object, such as large, middle, and small, for example), but the biased ratio (1/2 as to a large object, 1/4 as to middle and small objects, for example) may be appropriate.

In addition, in the aforementioned explanation, the processing such as a color addition and drawing on the image may be performed on the original image 100 stored in the image area 74 within the main memory 48, but in a case that a VRAM (not illustrated) is connected to the CPU 42, the processing may be performed on the original image 100 developed in the VRAM.

In the above-described embodiment, explanations are made on the game apparatus 10, but the present invention can be applied to an image processing apparatus (PC, PDA, cellular phone, etc. other than the game apparatus) having a computer (CPU). Example embodiments of the present invention can be applied to an image processing system in which each processing is distributedly executed by a plurality of computers, etc. The image processing system may execute all the processing by one information processing apparatus (computer).

Although example embodiments of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an image processing program, wherein said image processing program causes a computer of an image processing apparatus to provide functionality comprising:
   a distance calculator which calculates a distance from a predetermined position on an image to each position on said image;
   a probability setter which sets a probability in correspondence with the distance calculated by said distance calculator as to each of said positions;
   a position-to-be drawn determiner which determines whether or not the position becomes a position-to-be drawn at which a predetermined drawing is to be performed according to the probability set by said probability setter as to each of said positions; and
   a drawer which performs said predetermined drawing on each position which is determined as a position-to-be drawn by said position-to-be drawn determiner.

2. The non-transitory storage medium storing an image processing program according to claim 1, wherein
   said predetermined position is a central position of said image, and
   said probability setter sets a high probability as the distance calculated by said distance calculator is large.

3. The non-transitory storage medium storing an image processing program according to claim 1, wherein
   said image is made up of a plurality of sections each including two or more pixels,
   said distance calculator calculates a distance from the predetermined position on said image to each section on said image,
   said probability setter sets a probability in correspondence with the distance to said section calculated by said distance calculator as to each of said sections,
   said position-to-be drawn determiner determines whether or not said section becomes a position-to-be drawn at which a predetermined drawing is to be performed according to the probability set by said probability setter as to each of said sections, and
   said drawer performs said predetermined drawing once on each position which is determined as a position-to-be drawn by said position-to-be drawn determiner.

4. The non-transitory storage medium storing an image processing program according to claim 1, wherein said image processing program causes the computer of said image processing apparatus to provide further functionality comprising:
   an object selector which selects an object to be drawn at each position from a plurality of objects being different in kind; and
   a probability corrector which corrects said probability set by said probability setter depending on the kind of the object selected by said object selector, and
   said position-to-be drawn determiner determines whether or not the position becomes a position-to-be drawn at which the predetermined drawing is to be performed according to the probability corrected by said probability corrector as to each of said positions.

5. The non-transitory storage medium storing an image processing program according to claim 1, wherein said image processing program causes the computer of said image processing apparatus to provide further functionality comprising:

an additive color value calculator which calculates an additive color value in correspondence with the distance calculated by said distance calculator; and an additive color value adder which adds the additive color value calculated by said additive color value calculator to at least one color component at each of said positions.

6. The non-transitory storage medium storing an image processing program according to claim 5, wherein
said additive color value calculator increases the additive color value as the distance calculated by said distance calculator is large.

7. The non-transitory storage medium storing an image processing program according to claim 1, wherein said image processing program causes the computer of said image processing apparatus to provide further functionality comprising:
an outputter which outputs said image which has undergone said predetermined drawing by said drawer; and
an execution controller which performs a series of image processing by said distance calculator or by said outputter on said image which has not yet undergone said predetermined drawing every time that an execution instruction is issued.

8. The non-transitory storage medium storing an image processing program according to claim 7, wherein said image processing program causes the computer of said image processing apparatus to further provide functionality comprising:
a storage which stores said image which has already undergone said predetermined drawing when a saving instruction is issued with said image which has already undergone said predetermined drawing output.

9. The non-transitory storage medium storing an image processing program according to claim 3, wherein
said distance calculator further calculates a distance from the predetermined position of said image to each pixel of said image,
said image processing program causes the computer of said image processing apparatus to provide further functionality comprising:
an additive color value calculator which calculates an additive color value in correspondence with the distance to each pixel calculated by said distance calculator; and
an additive color value adder which adds the additive color value calculated by said additive color value calculator to at least one color component of each of said pixels.

10. The non-transitory storage medium storing an image processing program according to claim 1, wherein
said image processing apparatus further comprises an imager,
said image processing program causes the computer of said image processing apparatus to provide further functionality comprising:
an image reader which reads an image imaged by said imager, and
said distance calculator calculates a distance from the predetermined position on the image read by said image reader to each position on said image.

11. An image processing system, comprising:
a distance calculator which calculates a distance from a predetermined position on an image to each position on said image;
a probability setter which sets a probability in correspondence with the distance calculated by said distance calculator as to each of said positions;
a position-to-be drawn determiner, including at least one computer processor, which determines whether or not the position becomes a position-to-be drawn at which a predetermined drawing is to be performed according to the probability set by said probability setter as to each of said positions; and
a drawer which performs said predetermined drawing on each position which is determined as a position-to-be drawn by said position-to-be drawn determiner.

12. An image processing method, comprising:
a distance calculating step of calculating a distance from a predetermined position on an image to each position on said image;
a probability setting step of setting a probability in correspondence with the distance calculated by said distance calculating step as to each of said positions;
a position-to-be drawn determining step of determining, using at least one computer processor, whether or not the position becomes a position-to-be drawn at which a predetermined drawing is to be performed according to the probability set by said probability setting step as to each of said positions; and
a drawing step of performing said predetermined drawing on each position which is determined as a position-to-be drawn by said position-to-be drawn determining step.

13. An image processing apparatus comprising:
an input configured to receive an image; and
a computer processing system, including at least one computer processor, configured to at least:
calculate a distance from a predetermined position on the image to each position on said image;
set a probability in correspondence with the calculated distance to each of said positions;
determine whether or not the position becomes a position-to-be drawn at which a predetermined drawing is to be performed according to the set probability as to each of said positions; and
perform said predetermined drawing on each position which is determined as a position-to-be drawn by the determination.

14. The system according to claim 11, wherein
said predetermined position is a central position of said image, and
said probability setter sets a higher probability as the distance calculated by said distance calculator becomes larger.

15. The system according to claim 11, wherein
said image is made up of a plurality of sections each including two or more pixels,
said distance calculator is configured to calculate a distance from the predetermined position on said image to each section on said image,
said probability setter is configured to set a probability in correspondence with the distance to said section calculated by said distance calculator as to each of said sections,
said position-to-be drawn determiner is configured to determine whether or not said section becomes a position-to-be drawn at which a predetermined drawing is to be performed according to the probability set by said probability setter as to each of said sections, and
said drawer is configured to perform said predetermined drawing once on each position which is determined as a position-to-be drawn by said position-to-be drawn determiner.

16. The system according to claim 11, further comprising:
an object selector configured to select an object to be drawn at each position from a plurality of objects being different in kind; and a probability corrector configured to correct said probability set by said probability setter depending on the kind of the object selected by said object selector, wherein said position-to-be drawn determiner is configured to determine whether or not the position becomes a position-to-be drawn at which the predetermined drawing is to be performed according to the probability corrected by said probability corrector as to each of said positions.

17. The system according to claim 11, further comprising:
an additive color value calculator configured to calculate an additive color value in correspondence with the distance calculated by said distance calculator; and
an additive color value adder is configured to add the additive color value calculated by said additive color value calculator to at least one color component at each of said positions.

18. The system according to claim 17, wherein
said additive color value calculator is configured to increase the additive color value as the distance calculated by said distance calculator becomes larger.

19. The system according to claim 11, further comprising:
an outputter configured to output said image which has undergone said predetermined drawing by said drawer; and an execution controller configured to perform a series of image processing by said distance calculator or by said outputter on said image which has not yet undergone said predetermined drawing every time that an execution instruction is issued.

20. The system according to claim 11, further comprising:
an image reader is configured to read an image imaged by said imager, wherein
said distance calculator is configured to calculate a distance from the predetermined position on the image read by said image reader to each position on said image.

21. The non-transitory storage medium storing an image processing program according to claim 1, wherein
said predetermined position is a central position of said image, and
said probability setter sets a higher probability as the distance calculated by said distance calculator becomes larger.

22. The non-transitory storage medium storing an image processing program according to claim 5, wherein
said additive color value calculator increases the additive color value as the distance calculated by said distance calculator becomes larger.

* * * * *